Inventor
George C. Barton
By his Attorney

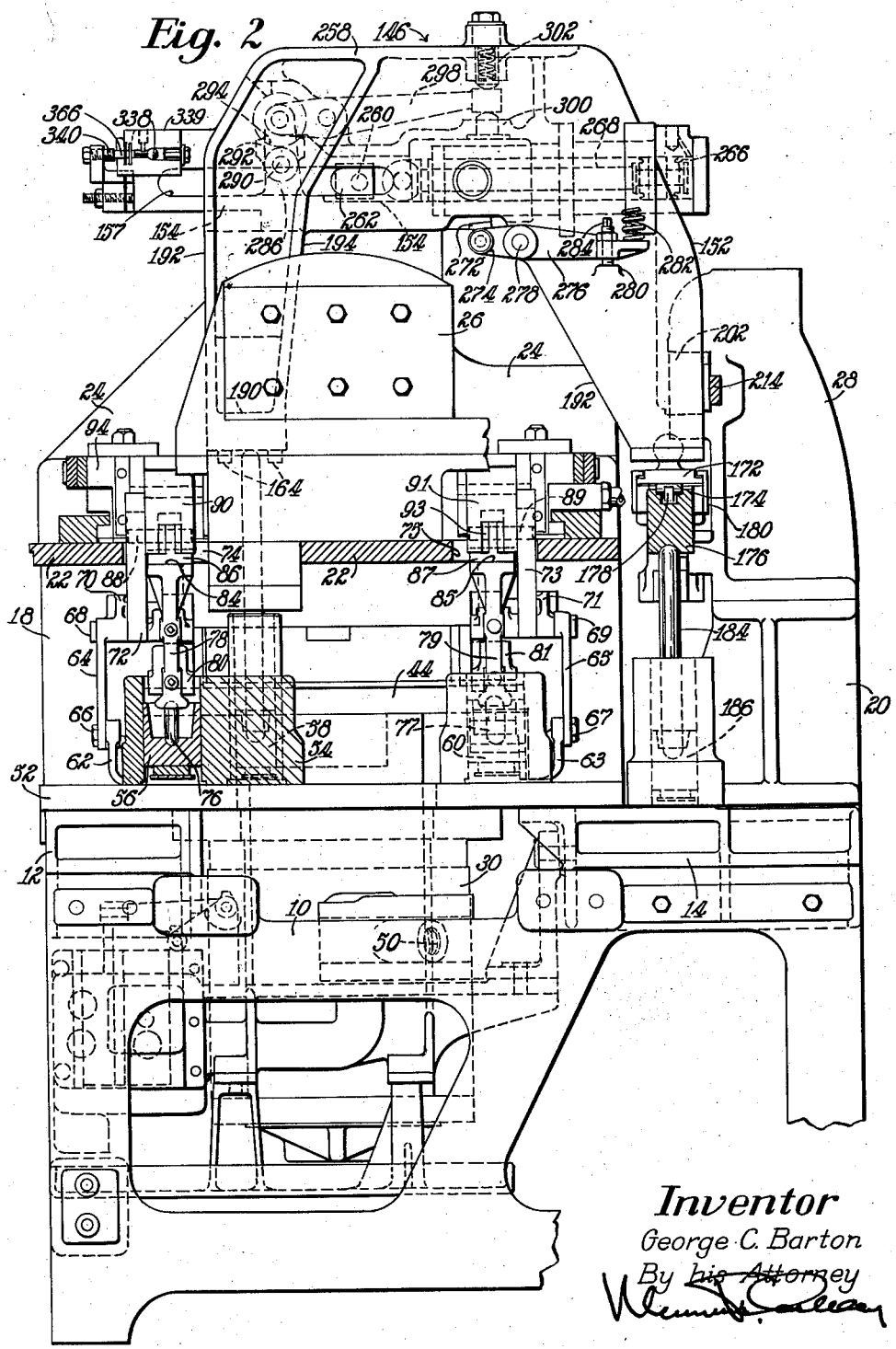

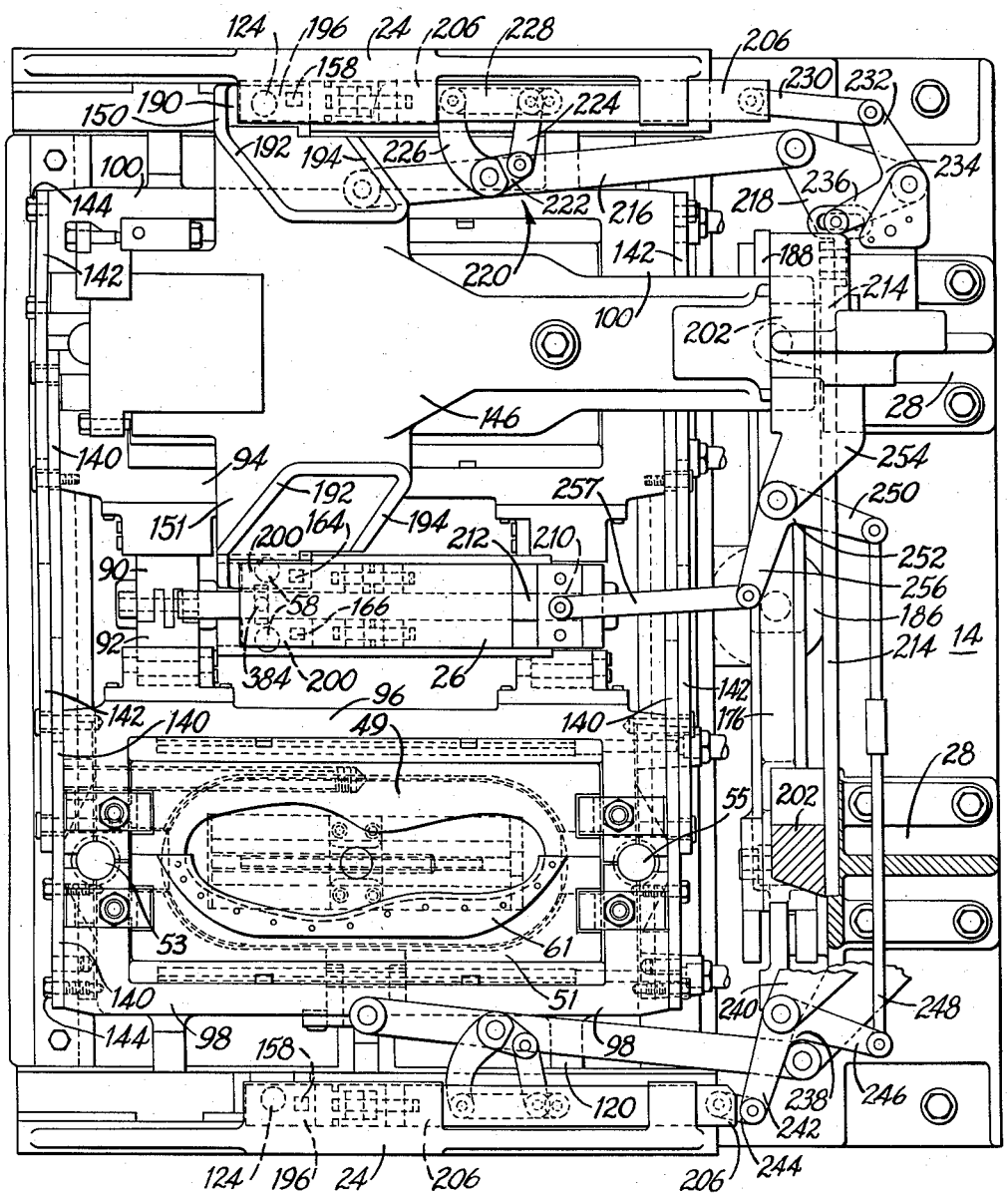

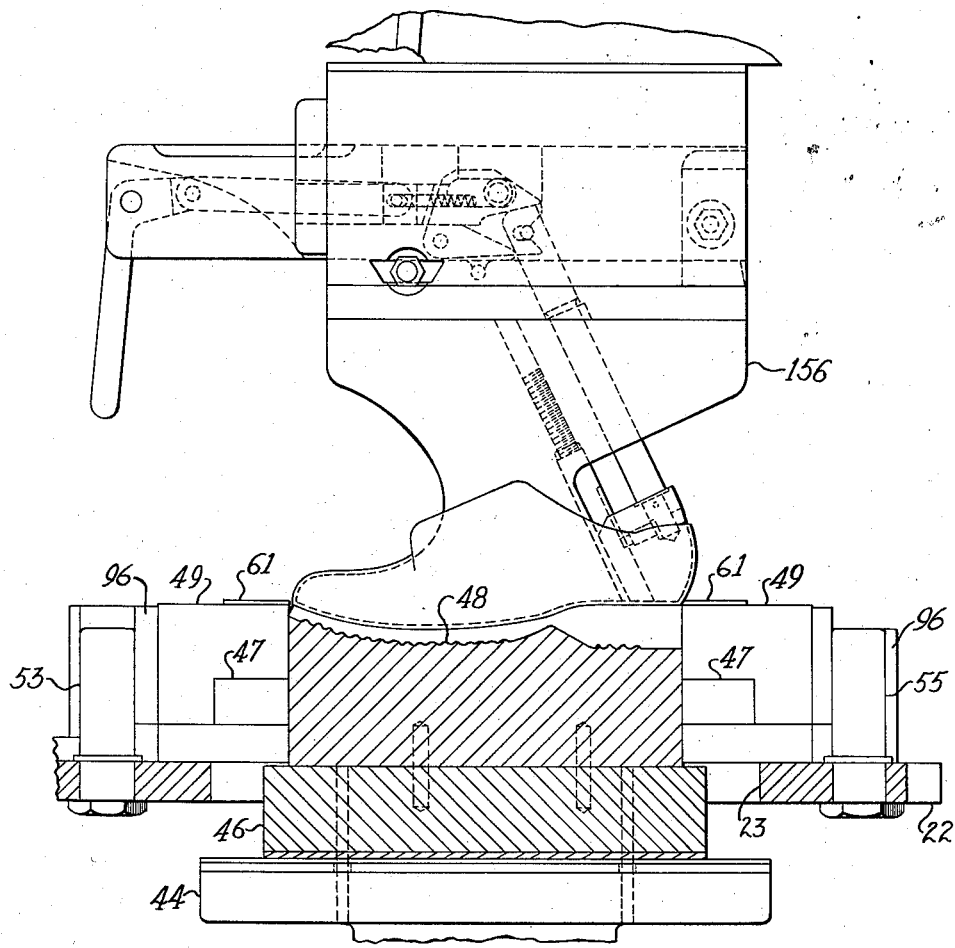

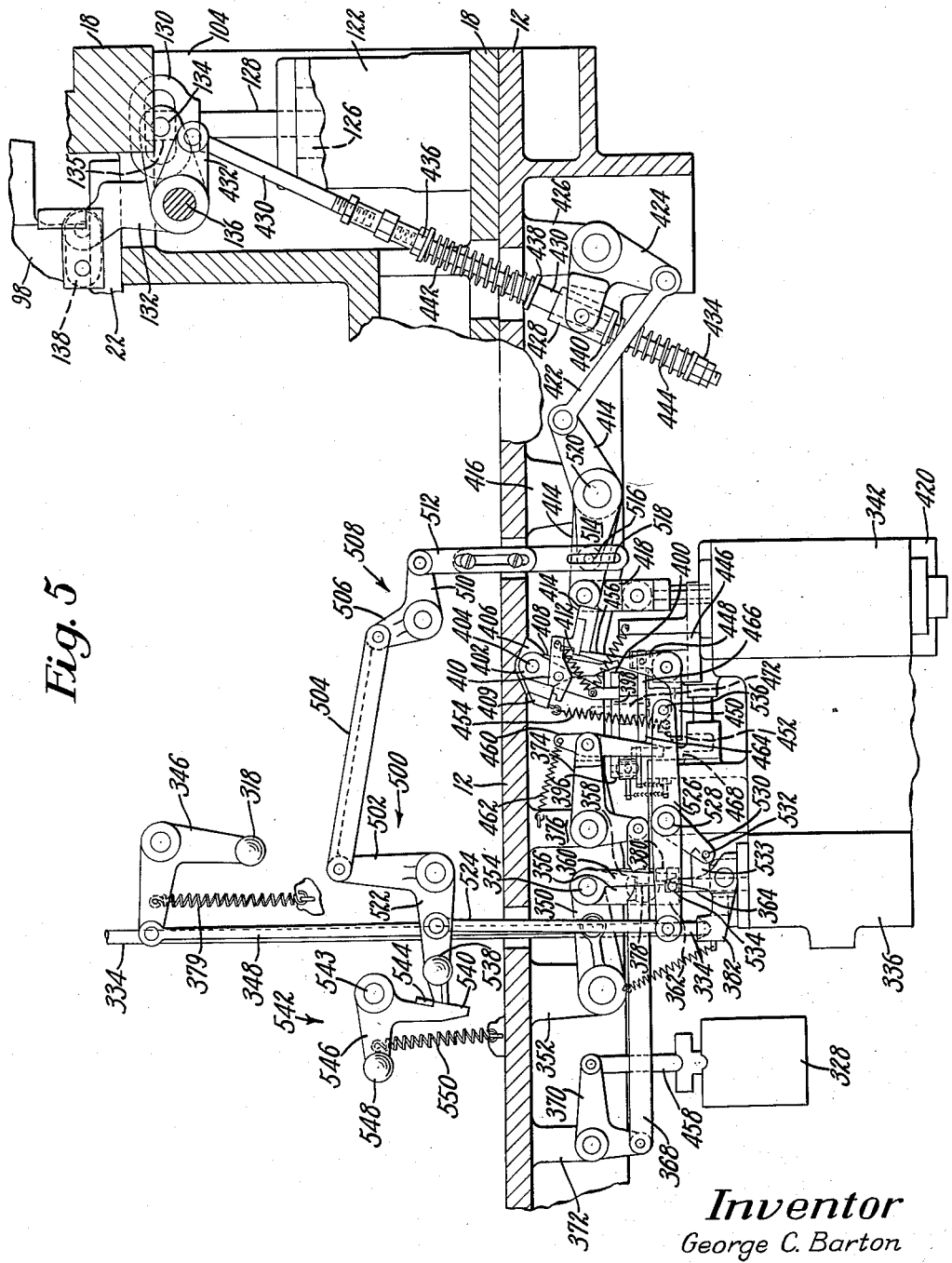

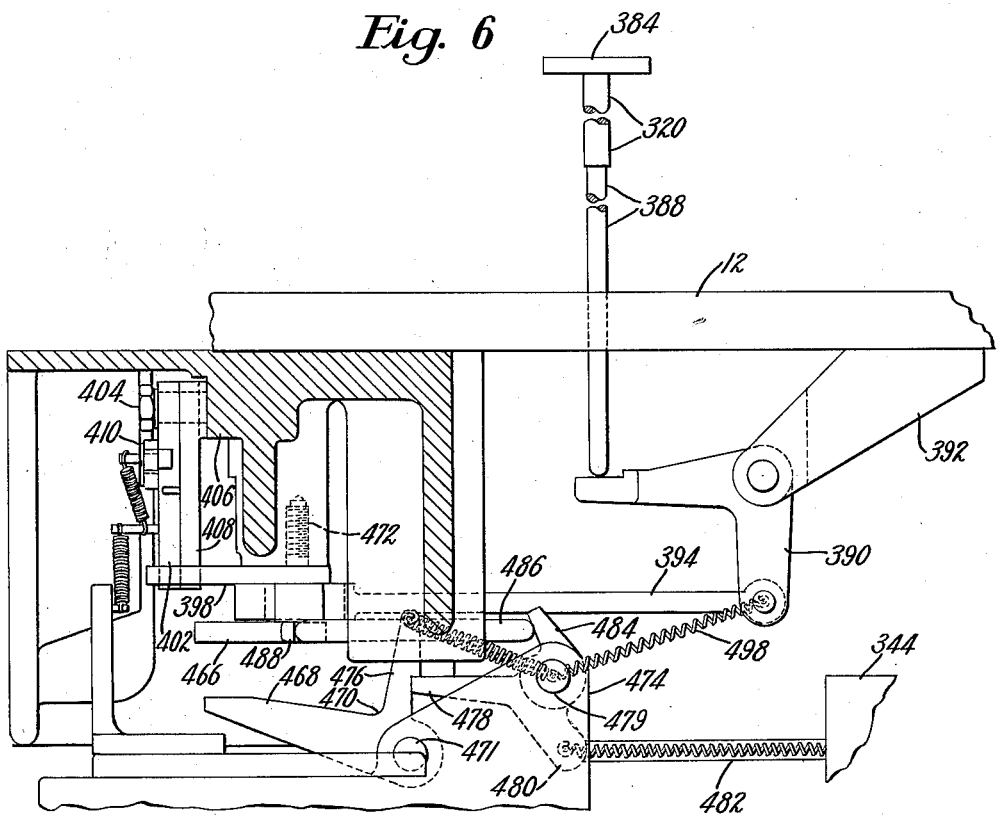
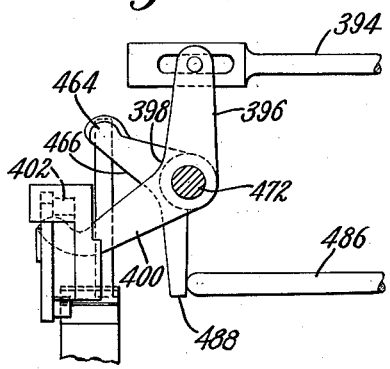

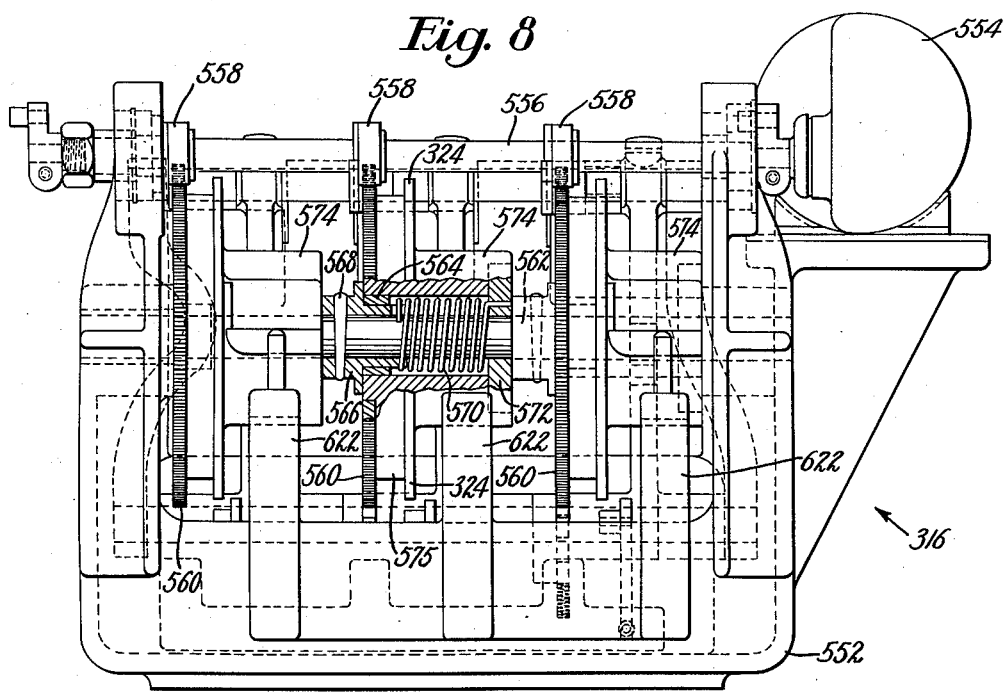
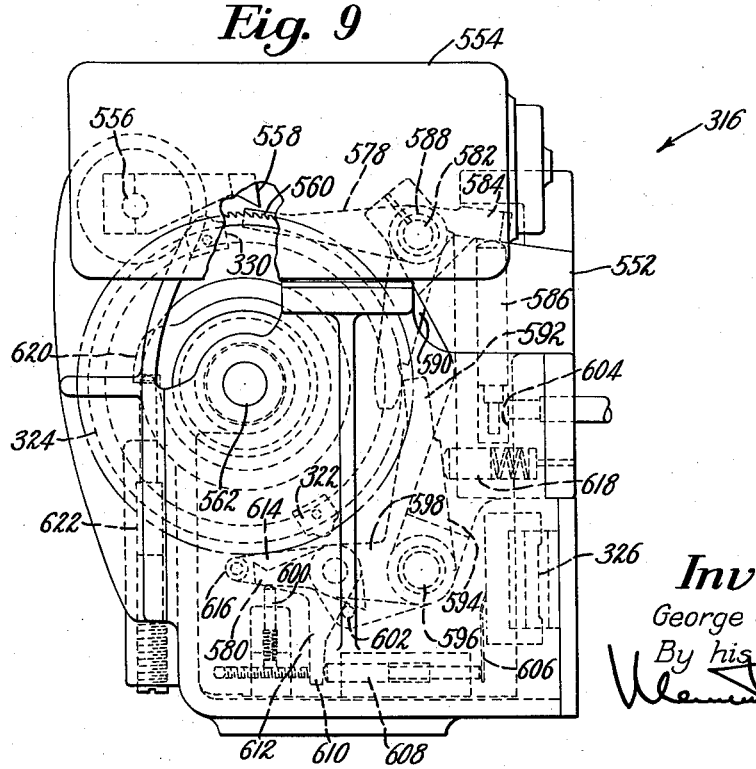

United States Patent Office
2,922,191
Patented Jan. 26, 1960

2,922,191

MOLDING MACHINES FOR PRESSING AND VULCANIZING PLASTIC MATERIALS

George Clifford Barton, Leicester, England, assignor to United Shoe Machinery Corporation, Flemington, N.J., a corporation of New Jersey Application October 8, 1956, Serial No. 614,734

Claims priority, application Great Britain December 2, 1955

12 Claims. (Cl. 18—17)

This invention relates to molding machines, and is herein illustrated in its application to machines for molding and attaching outsoles to shoe bottoms and curing or vulcanizing the outsole substance. It is to be understood, however, that the invention is not limited to machines which perform both a molding and a curing operation, nor to machines constructed and arranged to mold outsoles to shoe bottoms, but, on the contrary, in many of its aspects the invention is concerned with molding machines generally.

In the molding of plastic bodies such, for example, as outsoles and causing the attachment thereof to articles such as shoes, the production of a commercially acceptable product depends upon the accurate registration of the work piece relatively to the mold elements during the molding and attaching operation. It is an object of the present invention to provide, in a machine of this type, a work carrier which is movable to bring the work piece into accurate registration with the mold elements and is automatically adjusted to accommodate irregularities in a work piece, for example, variations in the thickness of shoe upper materials at opposite sides of a shoe.

It is a further object of the invention to provide a machine of this type which will complete its entire cycle without the aid of an operator, requiring only the manual operation of suitable means for initiating the machine cycle after the work piece has been properly mounted on its supporting member.

It is a further object of the invention to provide, in a machine of this type, a timing apparatus which facilitates the arrangement of a plurality of machines for operation in series by a single operator.

With these and other objects in view, as will hereinafter appear, the present application in one aspect thereof contemplates the provision in a molding machine of elements comprising a sole shaped bottom mold member and side mold members constructed and arranged to cooperate with the bottom mold member to provide a mold cavtiy and a work carrier for supporting a shoe in the machine. The illustrated carrier is mounted for movement toward and from the mold cavity and is held against movement from the mold cavity by suitable retainers which are advanced into operating position by means operated by the advancement of the side mold members, the advancement of the side mold members being initiated by the movement of the carrier toward the mold cavity. The retainers positively lock the carrier to the frame structure in order to hold the shoe in its position in the molding station against the pressure of the molding instrumentalities. In the illustrated organization a wedge is brought into position to hold one side member against retraction while the advancement of another side member is completed in order to close the mold cavity and position the work with relation to the bottom mold member.

In its application to a two station molding machine the present invention contemplates the combination with the work carriers, bottom mold members, outer side mold members and inner side mold members of means rendered operative by the movement of the carriers toward the molding station for fully advancing the outer side mold members and partially advancing the inner side mold members. The completion of the advancement of the inner side mold members is effected by a means the operation of which is initiated by the advancement of the outer side mold members.

To provide for the advancement of the work into and from the operating station the present invention contemplates the combination with the cooperating mold members of a tripodal work carrier one leg of which is mounted on a fulcrum element freely mounted on a rail at the upper end of an elevator, the other two legs of the carrier being mounted on separate elevators. The three elevators operate the carrier to advance the work into and from the operating or molding station.

In another aspect thereof the invention consists in the combination with the mold members of pressure fluid operated means for causing an initial advancement of the sole mold member under light pressure which is maintained during the first part of the vulcanizing cycle and until the outer surface of the charge has developed a skin which will tend to prevent objectionable flow of the charge between the side mold members and the shoe during the subsequent application of heavy pressure to the sole mold member. Upon the termination of the light pressure, a cam operates a valve to cause the application of relatively heavy pressure to the sole mold member—this being the same valve which initiates the advancement of the side mold members to close the mold cavity. Upon completion of the molding cycle, a valve controlled cam effects the retraction of the mold members. In the illustrated organization the cam operated means for retracting the mold members also causes the retraction of the work carrier. The duration of the molding cycle is measured by a synchronous motor which operates through a make and break member to cause the retraction of the mold elements and the return of the carrier to its retracted position.

The initiation of the molding cycle is effected by the operation of the cam operated valve above referred to by the downward movement of the carrier into the molding station. In the illustrated organization, said valve controls the operation of a piston for advancing the outer side mold member and for advancing the retainers for holding the carrier in the molding station against the molding pressure of the bottom mold member.

Invention is also to be recognized in the combination with the mold members and the work carrier of a plurality of retainers for the carrier biased to retracted positions, and means for closing the side mold members and concomitantly advancing the retainers into their respective operating positions.

These and other features of the invention will now be described with reference to the accompanying drawings and pointed out in the appended claims.

In the drawings,

Fig. 2 is a right side elevation of the machine with certain parts shown in section;

Fig. 3 is a plan view with certain parts omitted in one station in order to shown the molding assembly;

Fig. 4 is a right side elevation partly in section illustrating the shoe form and the molding assembly with the molds in their advanced position;

Fig. 5 is a front elevation on a larger scale than Figs. 1, 2 and 3 illustrating certain details of construction;

Fig. 6 is a right side elevation partly in section illustrating certain details of construction on a scale somewhat larger than Fig. 5;

Fig. 7 is a plan view illustrating certain details shown in Figs. 5 and 6;

Fig. 8 is a front elevation partly in section illustrating a timing unit; and

Fig. 9 is an end elevation of the timing unit illustrated in Fig. 8.

Figure 1:
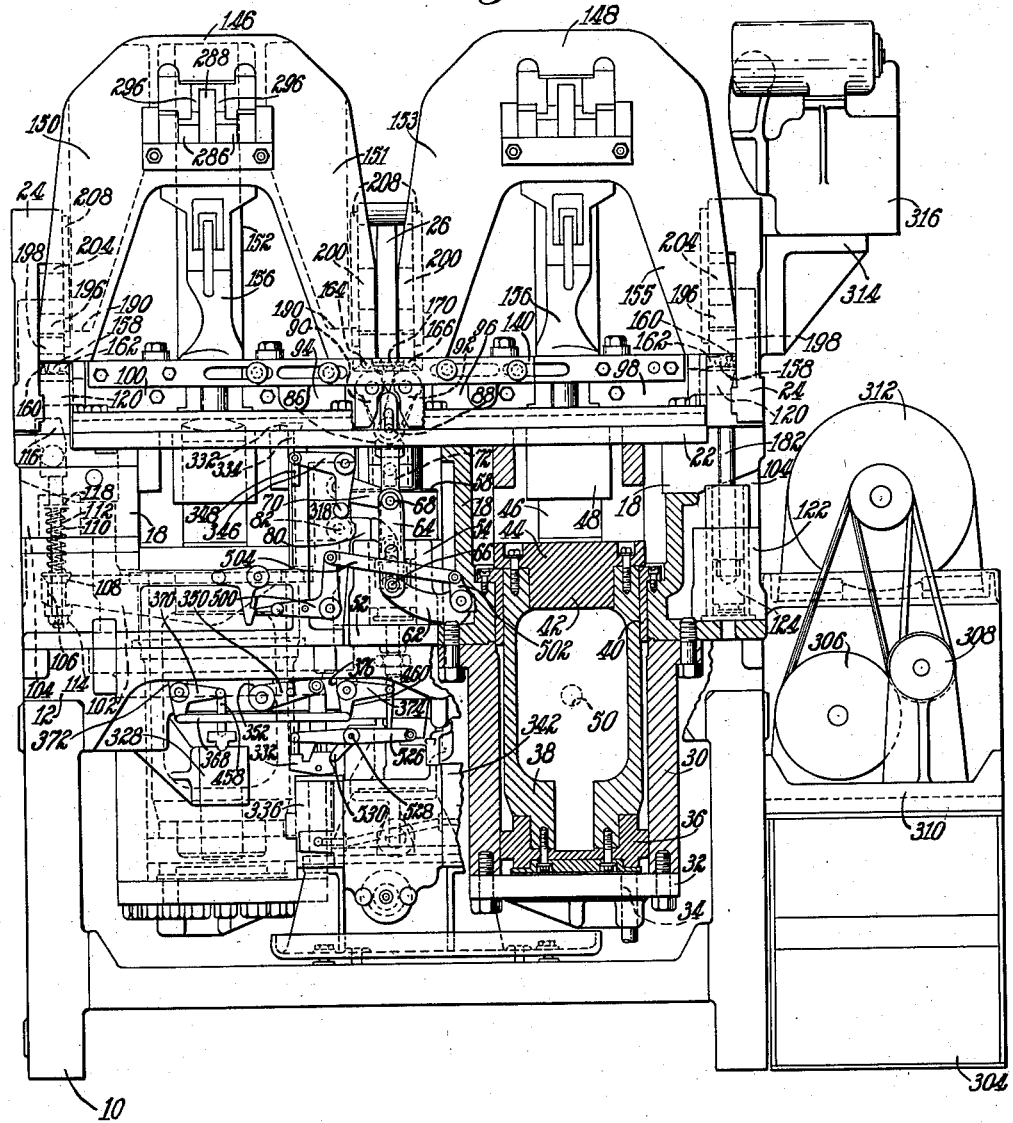
Fig. 1 is a front elevation of a machine embodying the features of the present invention, certain parts being broken away and other parts shown in section.

Referring to Figs. 1 and 2, the invention is illustrated as embodied in a two-station machine for molding, curing or vulcanizing rubber soles and attaching them to the bottoms of shoes prepared to receive them. In each station there is provided a shoe supporting form, heated side mold members arranged to enclose the sole portion of a shoe in the machine and a heated sole shaped bottom mold member which is elevated to press a charge of vulcanizable material against the bottom of the shoe after the side mold members have closed around it.

Referring to Figs. 1 and 2, the machine comprises a frame 10 supporting a horizontal front member 12 and a similar horizontal rear member 14. Mounted on the members 12 and 14 at the right side of the machine is a forward standard 18 and a rear standard 20. Similar forward and rear standards are mounted on the members 12 and 14 at the left side of the machine. A table 22 mounted on the four standards extends across both stations of the machine. Upright members 24 having upwardly converging edge faces are mounted on the forward standards 18 at opposite sides of the machine and a third upright member 26 (Fig. 1) is mounted on the table 22 approximately midway between the members 24. At the rear of the machine upright members 28 similar to the members 24 are mounted on the rear standard 20.

In the following description of the operating instrumentalities of the machine it is to be understood that the structures in the two stations are identical and in all cases where the organization in only one station is identified the description applies equally well to the other station.

Referring to Fig. 1, there is secured to the forward standard 18 in the right station of the machine a cylinder 30 the base of which is closed by a head 32 in which is formed a port 34. Mounted for vertical movement in the cylinder 30 is a double acting piston 36 having mounted thereon a hollow head 38 which is only slightly less in diameter than the cylinder. The piston head 38 extends upwardly beyond the upper extremity of the cylinder 30 and its upper portion is slidably mounted in a bushing 40 mounted in the standard 18. Mounted in a large bore in the upper portion of the piston head 38 is the cylindrical base portion 42 of a rectangular head 44 which is guided in channels formed in opposite side portions of the standard. The head 44 supports a heater block 46 on which is mounted the sole shaped bottom mold member 48.

Formed in the table 22 is an aperture 23 (Fig. 4) within which operates the bottom mold member 48, and secured to the table 22 on either side of said aperture are plates 47, the inner edge faces of which are shaped complementally to the peripheral contour of the bottom mold member 48. Slidably mounted on the table 22 are carriages 94 and 96 which carry inner mold members 49 and carriages 98 and 100 on which are mounted outer mold members 51. In each station of the machine the two mold carriages, as they come to the limit of their movement toward each other, are positioned by two dowel posts 53 and 55 mounted respectively in the front and rear portions of the table 22. When the two carriages are in their closed position in registration with the two dowel posts 53 and 55, the plates 47 are enclosed in recesses in the lower portions of the carriages respectively. To provide for rectilinear movement of the carriages, gibs (not shown) are secured to the table 22 and register with suitable grooves formed in the mold carriages.

Secured to each of the carriages is a plate containing a heating element and a thermostat of known construction, the mold member being secured to the upper surface of the carriage inwardly from said plate. The construction of each pair of side mold members is such that the upper portions of their inner side faces have surfaces complemental to the edge contour of the sole of a shoe. It will be understood that when the mold carriages engage the dowel posts 53 and 55 at the limit of their inward movement the right and left side mold members likewise meet, sliding over the plates 47. Each mold member has secured to its upper surface a crease plate 61 which engages the shoe upper and thus establishes the junction between the sole and the upper and prevents leakage of sole material onto the portion of the upper above the junction line.

The bottom mold member 48 is elevated to press a charge of vulcanizable material against the bottom of a shoe in the machine by the hydraulic operation of the piston 36 (Fig. 1) by pressure fluid entering the cylinder 30 through the port 34 and imparting upward movement to the piston assembly. The fluid above the piston 36 in the cylinder 30 is exhausted through a port 50 (Fig. 2) in the wall of the cylinder. The piston 36 is returned to its lower or rest position by pressure fluid entering the cylinder 30 through the port 50 and acting on the upper surface of the piston 36, fluid beneath the piston being exhausted through the port 34.

Mounted on the frame 10 between the forward standards 18 is a horizontal plate 52 which extends from the front to the rear of the frame 10 and across the full width of the two stations of the machine. Mounted on the plate 52 in the front center of the machine is an elongated block 54 in which are mounted three vertically moving pistons defining a triangle the apex of which is formed by a piston 56 (Fig. 2) and the base by two pistons 58 (Fig. 3) which are somewhat smaller than the piston 56. At the rear of the plate 54 is mounted a fourth piston 60 (Fig. 2). The pistons 56 and 60 are similar in construction and respectively operate two pairs of toggle links connected to the opposite ends of the carriages which mount the inner mold members. The two inner mold members 49 are caused to move away from the shoe after the completion of the vulcanizing operation by the operation of the pistons 36. To this end there is secured to the lower portion of the front of the head 44 in the right station of the machine an arm 62 (Fig. 2) extending widthwise of the machine, its left end portion passing through an aperture in the standard 18 and terminating in an arcuate structure, as shown in Fig. 1. A similar arm 63 (Fig. 2) is secured to the lower portion of the rear end of the head 44 in the left station of the machine. The arm 62 carries a pin 66 movable in a slot in a link 64 fulcrumed on a pin 68 mounted in a forked lever 70. The lever 70 is fulcrumed on a pin journaled in a lug formed in the right upper portion of the left front standard 18. Between the bifurcations of the lever 70 embracing the pin 68 a toggle breaking link 72 is pivotally mounted. The link 72 extends upwardly through an aperture 74 formed in the table 22, the upper end of the link 72 being slotted as shown in Fig. 1. Downward movement of the link 72 serves to break toggle links 90 and 92 connected to the carriages 94 and 96 of the two inner mold members thereby moving the mold members away from the shoes in the two stations of the machine. For breaking toggle links 91 and 93 (Fig. 2) at the rear of the machine corresponding to the toggle links 90 and 92 above referred to, a link 65 corresponding to the link 64 in front of the machine is pivotally connected at its lower end to the arm 63 and at its upper end to a lever 71 corresponding to the lever 70 in front of the machine, the lever 71 being connected to the toggle links 91 and 93 by a link 73 corresponding to the link 72 in the front of the machine. The arms 62 and 63 are moved downwardly concomitantly and uniformly to break the toggle links and thus to retract the mold carriages 94 and 96 into their rest positions in their respective stations of the machine.

The mold carriages 94 and 96 are advanced to bring the inner mold members into their respective operating positions by the operation of the piston 56 located immediately to the rear of the left end portion of the arm 62 and by a simultaneous operation of the corresponding piston 60 (Fig. 2) in the rear of the machine. Thrust pins 76 and 77 are mounted in suitable recesses in the pistons 56 and 60 respectively, and in upwardly extending links 78 and 79. The bifurcations of levers 80 and 81 respectively embrace the links 78 and 79 and are pivoted thereto, the opposite end of the lever 80 being fulcrumed on a pin 82 (Fig. 1) mounted in a lug formed in the right upper portion of the left front standard 18 at a point below the lever 70, and the companion lever 81 being similarly fulcrumed. Above the lever 80 the link 78 is pivoted on the pin 68 rearwardly of the lever 70, the levers 70 and 80 in the front of the machine and 71 and 81 in the rear providing parallel motion mechanisms for actuating the links 78 and 79. The upper end portions of the links 78 and 79, which are located above the pins 68 and 69, are broadened so that their upper extremities are in the form of plane rectangular surfaces 84 and 85 constructed and arranged to engage the plane lower surfaces of members 86 and 87 which carry pins 88 and 89 respectively on which are pivotally mounted and extending divergently upwardly therefrom the two toggle links 90 and 92 in the front of the machine and the toggle links 91 and 93 in the rear. The forward portions of the pins 88 and 89 slide freely in vertical slots in the links 72 and 73. The upper portions of the toggle links are pivotally connected to brackets secured to the mold carriages 94 and 96. In the operation of the illustrated machine the head 44 is elevated, causing the arms 62 and 63 to move upwardly. The pins 66 and 67 in the arms 62 and 63 respectively move upwardly with the arms. During the first stage of their upward movement the pins 66 and 67 move through the slots in the links 64 and 65, the links remaining stationary. Before the pins come to the upper limit of the slots the pistons 56 and 60 are elevated to cause the links 78 and 79 to move upwardly thus moving the members 86 and 87 upwardly through the apertures 74 and 75 in the table 22. The upward movement of the members 86 and 87 straightens the toggle links thus moving the inner mold carriages 94 and 96 outwardly into shoe engaging position. At the limit of their outward movement the mold carriages 94 and 96 engage the dowel posts 53 and 55 and come into butting relation to the outer mold carriages 98 and 100. At the completion of the straightening of the toggle links the inner mold members in each station are in position for the molding and vulcanizing operations.

At the end of the vulcanizing operation the molds are opened by movement of the inner mold members toward each other by the breaking of the toggle links effected by downward movement of the head 44 and the corresponding head in the left station of the machine. The downward movement of the head 44 causes the arms 62 and 63 to impart downward movement to the links 64 and 65 and the toggle breaking links 72 and 73. Thus, the surface 84 of the link 78 and the surface 85 of the link 79 are moved downwardly from the members 86 and 87 permitting the toggle breaking links 72 and 73 to break the toggles and cause the inner mold carriages 94 and 96 to move toward each other and away from the shoes in the machine, the vulcanizing operation having now been completed.

Secured to the under side of the front portion of the head 44 in the left station of the machine is a short arm 102 (Fig. 1), a similar arm being provided in the right station. The arm 102 extends widthwise of the machine and its left end portion extends through an aperture in the left wall of the forward standard 18 and into a large recess 104. Mounted in a vertical bore 106 in the left end portion of the arm 102 is a flanged sleeve 108 which is engaged by a spring 110 surrounding a rod 112 mounted in the sleeve 108 and extending upwardly therefrom. The arm 102 bears against a nut 114 on the lower end portion of the rod. The upper portion of the rod extends through openings in the standard 18 and the upright 24 and its upper end portion is bifurcated and has pivotally mounted therein a wedge 116. When the head 44 is elevated in the operation of the machine the arm 102 moves with it causing the spring 110 to press upwardly against a collar 118 on the rod 112 thus elevating the rod and the wedge 116. The wedge is thus moved into a space between the upright 24 and a wedge shaped extension 120 of the outer mold carriage 100 (Fig. 3) thus preventing outward movement of the carriage under the thrust exerted against the outer mold in the vulcanizing operation. Further upward movement of the arm 102 after the wedge 116 has been arrested by its engagement with the extension 120 compresses the spring 110, the upward movement of the arm 102 terminating when the head 44 comes to the limit of its upward movement. A wedge similar to the wedge 116 and performing the same function at the rear of the machine is carried by an arm corresponding to the arm 102 in the right station of the machine. Thus it will be seen that the outer mold members are effectively held against outward movement by wedges acting against their front end and rear end portions, respectively. It will be understood that the operation of the wedges is effected by the upward movement of the head 44 concomitantly with the operation of the toggle links 90 and 92 to impart outward movement to the inner mold members. Because of the slots in the toggle break link 72 and its companion link 73 and because of the fact that the arm 102 has risen above the nut 114 the wedges remain stationary during the first part of the downward movement of the head 44. As soon as the head 44 has moved downwardly to an extent sufficient to cause the toggle break link 72 and its companion link 73 to bear on the pins 68 thereby to break the toggle, the arm 102 has moved downwardly sufficiently to engage the nut 114 and thus to move the wedge 116 downwardly out of operating position thus permitting retraction of the outer mold carriage.

The inner and outer side mold members in each station of the machine in their closed or operating position provide the entire periphery of the mold cavity and determine the peripheral contour of the edge face of a sole formed in the mold assembly. In the operation of the mold carriages the crease plate of the outer mold member in each station is moved into engagement with the adjacent side portion of a shoe in the machine before the inner mold member engages the shoe thus permitting the shoe to be alined laterally with relation to the outer mold member. The timing of the operation of the outer mold member with relation to the operation of the inner mold member is achieved by providing for a predetermined lost motion in the mechanism for advancing the inner mold members. After the outer mold member has engaged the shoe and the shoe has become accurately registered with relation thereto the inner mold member is advanced by the toggle mechanism hereinbefore described to cause it to close the mold cavity provided by the inner and outer mold members and to cause the bottom portion of the shoe to be engaged under pressure between the inner and outer mold members.

The mechanism for actuating the outer mold members will now be described. Mounted on the forward standard 18 and in the recesses 104 at opposite sides of the machine are blocks 122. The block at the right side of the machine is set between the arms 62 and 102 and contains two vertically operating pistons 124 and 126, the former being positioned forwardly of the latter. The piston 124 operates to elevate a shoe supporting carrier after the completion of the vulcanizing operation, and the piston 126

(Fig. 5), which is double acting, operates to impart inward and outward movement to the outer mold carriage in the station in which the piston is mounted and inward movement only to the inner mold carriage in the opposite station. Extending upwardly from the piston 126 is a rod 128 (Fig. 5) which has at its upper end a horizontally slotted head 130. The lower arms of a bifurcated bell crank lever 132 embrace the slotted head 130 and carry a pin 134 which extends through the slot in the head 130 and carries a block 135. The bell crank lever 132 is secured at its elbow on a shaft 136 the ends of which are journaled in lugs formed in the forward standard 18 and located in the upper part of the recess 104. The upper arm of the bell crank lever 132 extends through an opening in the forward standard 18 and upwardly through a slot in the table 22, and its upper end is pivoted between the arms of a link 138 pivoted on the carriage 98 approximately midway between its ends so that rocking movement of the bell crank lever 132 causes the carriage to move horizontally toward or from a shoe in the machine. Secured to the forward and rearward faces of the right mold carriage 98 are two links 140 (Figs. 1 and 3) which extend widthwise of the machine and have their left end portions secured to the forward and rearward faces of the carriage 94 in the left station by screws extending through slots in the links 140. Secured to forward and rearward portions of the outer mold carriage 100 in the left station are links 142 which extend to the right and have their right end portions movably mounted on forward and rearward faces of the mold carriage 96 in the right station by screws which extend through slots in the links 142 and through slots in the links 140 which are located inwardly from the links 142.

The construction and arrangement of the mechanism above described are such that when the shoes in the machine are located in the operating or molding station the piston 126 is moved upwardly by fluid pressure and the bell crank lever 132 (Fig. 5) is swung in a counter-clockwise direction by the piston rod 128 causing the outer mold carriage 98 to move inwardly on the table 22. Inasmuch as the outer mold carriages 98 and 100 are connected by the links 140 and 142 to the inner mold carriages 94 and 96, the operation of the pistons 126 causes the inner mold carriages to move away from each other and toward the shoes in the machine. When the pistons 126 have completed their upward movement the position of the outer mold carriages 98 and 100 is such that the side molds contained therein are at the limit of their inward movement. However, due to a lost motion caused by the slots in the links 140 and 142 in which are mounted the screws attaching the links to the inner mold carriages 94 and 96, said inner mold carriages are not in their fully closed position and do not then engage the shoe. Inasmuch as no substantial force is required to effect the movement of the mold members above described, relatively small pistons are provided for this operation.

The final advancement of the inner mold carriage is effected by the straightening of the toggle links 90 and 92. The advancement of the inner mold members is arrested by their engagement with the dowel posts 53 and 55. In this position the inner molds and the outer molds form an enclosure around the shoe, the slots in the links 140 and 142 permitting such movement of the inner molds without altering the positions of the outer molds. The wedges 116, bearing against the extensions 120 of the outer mold carriages positively hold the carriages against outward movement. The inner molds are positively held against movement away from the outer molds by the straightened toggle links. Downward movement of the piston 126 and the two toggle break links 72 cause the side molds to separate from the shoe after the completion of the vulcanizing operation.

For supporting a shoe in each station between the inner and outer side mold members the illustrated machine is provided with two carriers 146 and 148 having a bridge-like structure, each carrier having two forward legs 150 and 151 and a rear leg 152, the legs being formed integrally with a top section of inverted channel construction extending horizontally over the mold station. In the carriers are members 154 (Fig. 2) on which are removably mounted shoe forms 156 (Fig. 1) on which are mounted shoes to be operated upon. The carriers 146 and 148 are movable bodily, upwardly and downwardly. When the carriers are at the limit of their downward movement the shoes are in the molding stations in position for the side mold members to close against them. Referring to Figs. 1 and 2, when the carrier 146 is in its downward position the left leg 150 rests on rollers 158 which are movable widthwise of the machine in parallel channels formed in the upper portion of the forward standard 18. To the left of the rollers 158 are rods which are secured to the standard 18 and are surrounded by light compression springs 160 which bear against the rollers. To restrain the rollers 158 from movement horizontally out of their channels upwardly extending leaf springs 162 are mounted at the right or inner ends of the channels in order to hold them against the thrust of the springs 160. The right or inner leg 151 of the carrier 146 in its downward position rests on rollers 164 which are mounted in the same manner as the rollers 158 in channels formed in the central member 26. In this case the channels extend from the left side of the member 26 to the right side thereof so that similar rollers 166 may support the left leg 153 of the right carrier 148. A compression spring 170 bears against the rollers 164 and 166 in each channel. The rearward extension 152 of the carrier 146 is provided with a ball-and-socket mounting on a plate 172 (Fig. 2) which rests on rollers 174 mounted for movement widthwise of the machine in a channel rail 176, said channel rail providing also the support for the rear portion of the carrier 148. A downwardly extending lug in the plate 172 carries a spring (not shown) which presses against the rollers 174. Excessive movement of the rollers in the channel rail 176 is prevented by the leaf springs 178. Flanged plates 180 secured to the channel rail 176 and extending upwardly therefrom hold the plate 172 from moving off the rollers 174.

The construction and arrangement of the carrier organization are such that when the carriers are in their downward position and the outer side mold members are advanced into engagement with the shoes mounted on the carriers, the carriers are moved laterally by the thrust of the side mold members into registration with the sole mold. In most cases the inward movement of the outer mold carriages 98 and 100 causes the initial lateral movement of the carriers 146 and 148 to take place while the outward movement of the inner mold carriages 94 and 96 brings the shoes into their correct angular position between the inner and outer molds. The illustrated construction and arrangement of the carrier assembly provide for each carrier a three-point mounting permitting bodily movement or angular movement of each carrier to bring the shoe into proper registration with the mold members.

When a pair of shoes have had soles molded and vulcanized thereto in the illustrated machine, the side molds move away from the carriers in order to permit the shoe supporting members to move the shoe into a loading station in which the completed shoe may be removed and another shoe to be operated upon mounted on the form.

The means by which the carriers are raised and lowered will now be described with reference particularly to the right carrier 148. It will be recalled that the block 122 has mounted therein a small piston 124. A thrust member or elevator 182 extends upwardly from the piston 124 through suitable openings in the forward standard 18, its upper end portion being positioned between the parallel channels in which the rollers 158 are mounted. The operation of the piston 124 forces the member 182 upwardly against the right leg of the carrier 148 lifting the leg off the supporting rollers. The left leg of the carrier is raised by a similiar elevator extending upwardly from the right piston 58 and the right leg of the carrier 146 in the left station is raised by an elevator extending from the left piston 58. The left leg of the left carrier 146 is raised by the piston 124 in the left station acting on an elevator similar to the member 182. As has been seen, the rear legs 152 of the carriers are supported on the channel rail 176 by means heretofore described. The channel rail extends widthwise of the machine and is supported midway between its ends by an elevator or thrust member 184 which extends upwardly from a small piston 186 mounted on the rear frame member 14. Upward movement of the thrust member 184 by the piston 186 elevates the legs 152 uniformly. To hold the channel rail 176 against angular movement relatively to the member 184 the ends of the channel member are bifurcated to embrace vertical plates 188 (Fig. 3) which are secured to brackets extending forwardly from the members 28.

The construction and arrangement of the assembly above described are such that when it is desired to elevate the carriers 146 and 148 at the end of a vulcanizing operation, pressure fluid is brought to bear against the two pistons 124 (Fig. 1), the two pistons 58 and the piston 186 (Fig. 2) simultaneously to lift the shoes clear of the mold members. It will be understood that when the carriers are in their lowermost positions and the shoes carried thereby are in the process of having soles molded and vulcanized thereto the side mold members are pressed firmly against the periphery of the shoe. In the course of the molding operation the bottom mold members are forced upwardly tending to elevate the carriers and the initial upward movement of the bottom mold members is under relatively low pressure in order to afford the charge in the mold cavity an adequate opportunity to fill the voids in the mold cavity and to be distributed uniformly upon the surface of the shoe bottom. After a predetermined interval the bottom mold members are forced upwardly under relatively high pressure which is maintained until the vulcanizing operation has been completed. During the application of heavy pressure to the bottom mold members the carriers 146 and 148 are held against upward movement by retainer means now to be described. The illustrated retainer means acts against horizontal surfaces provided by base portions 190 (Fig. 1) formed at the lower extremities of the legs 150, 151 and 152, said base portions being integral with ribs 192 and 194 (Fig. 2) formed in the legs and extending upwardly into the body portion of the carrier. The lower extremities of the ribs 192 and 194 adjacent to the base portions 190 are cut away to provide clearance for the movement of retainer members or blocks between the upper surfaces of the base members 190 and abutments in the form of overlying extensions of the upright members 24, 26 and 28. The means by which the blocks are moved to and from their retaining positions will now be described. For the left leg 150 of the left carrier 146 and the right leg 155 of the right carrier 148 a pair of retainer blocks 196 are provided. These blocks normally rest on inwardly extending portions 198 of the forward standards 18. For the inner or adjacent legs of the two carriers retainer blocks 200 are provided, said blocks being mounted in recesses formed in the upright member 26. For the rear legs of the two carriers retainer blocks 202 (Fig. 2) are mounted on the upright member 28. The left retainer block 196 is slidably mounted on the upper portion of the forward standard 18. The upper surface of the block 196 is in frictional contact with a wedge 204 the upper surface of which engages an overhanging portion of the upright member 24. Extending rearwardly from the wedge 204, through an opening in the upright member 24, is a rod (not shown). The rear portion of the rod carries a compression spring which is confined between the upright member 24 and a collar on the rod. A tail portion of the retainer block 196 is pivotally connected to a rearwardly extending slide rod 206 (Fig. 3). The construction and arrangement of the assembly above described are such that when the carrier 146 is at the limit of its downward movement forward pressure exerted on the slide rod 206 causes the retainer block 196 to slide forwardly over the extension 198 until it rests on the upper surface of the base portion 190 of the leg 150. The wedge 204 moves forwardly with the block 196 due to its frictional contact therewith and when the retainer block is in position on the base portion 190 the wedge 204 locks it in position by its wedging action between the upper surface of the block 196 and the lower surface of the overlying portion of the upright member 24. In order to prevent lateral movement of the block 196 a retaining plate 208 (Fig. 1) is mounted between the overhanging portion of the upright member and the forward standard 18. The retainer blocks 200 are similar in construction and operation to the blocks 196, differing therefrom only in that their tail portions are pivotally connected to the bifurcated head 210 (Fig. 3) of a rearwardly extending slide rod 212 which actuates the two retainer blocks 200 which engage the base portions of the inner or adjacent legs of the carriers 146 and 148. The retainer block 202, when not in engagement with the base portion of the rear leg of the carrier, is in sliding engagement with a forwardly extending portion of the upright member 28. A bar 214 extending through recesses in the upright members 28 is secured to the rear portion of the retainer block 202 so that when the bar 214 is moved to the right the retainer block is advanced into locking engagement with the base portion 190 of the rear leg of the carrier. Conversely movement of the bar 214 to the left retracts the retainer block 202 and moves it out of engagement with the base portion of the leg and into its rest position. Movement of the retainer block which engages the rear leg of the carrier and movement of the retainer block which engages the left front leg of the carrier 146 is effected by movement of the outer mold carriage in the left station. Movement of the other three blocks, that is those which engage both front legs of the carrier 148 and the right front leg of the carrier 146, is effected by movement of the outer mold carriage in the right station. To this end there is secured to the upper surface of the outer mold carriage 100 in the left station the forward ends of two parallel links 216 (Fig. 3) the rear ends of which are pivoted on an extension 218 of the left upright member 28. Pivotally connected to the links 216 between their ends is a bell crank lever 220, the arm 222 of which is pivotally connected to one end of a link 224 the other end of which is pivoted on the forward standard 18. The other arm 226 of the bell crank lever 220 is pivotally connected to one end of a link 228 the other end of which is pivotally connected to the bottom of the slide rod 206 which is connected to the retainer block 196.

The construction and arrangement of the assembly above described are such that when the mold carriage 100 is advanced inwardly, as hereinbefore described, the forward portions of the parallel links 216 swing inwardly. Because of the connection of the bell crank lever 220 to the link 224, which is pivoted on the forward standard 18, the arm 226 of the bell crank lever moves forwardly and, acting through the link 228 and the slide rod 206, causes the retainer block 196 to be advanced into locking engagement with the base portion 190 of the left leg of the carrier 146. Outward movement of the mold carriage causes the retainer block to be retracted into its rest position. A similar linkage is provided for actuating the retainer block 196 at the right side of the machine and the retainer blocks 200 which operate on the inner legs of the carriers. Pivoted to the rear portion of the slide rod 206 connected to the left retainer block 196 is a lever 230 the opposite ends of which is pivotally connected to an arm 232 of a bell crank lever 234 which is pivoted to a rearwardly extending portion of the extension 218. The other arm 236 of the bell crank lever is connected by a suitable link to the left end portion of the bar 214. The foregoing construction and arrangement are such that when the mold carriage 100 advances inwardly causing the slide rod 206 to advance forwardly, the bell crank lever 234 is swung to the right thus moving the bar 214 to advance the blocks 202 into locking engagement with the base portions of the rear legs of the carriers. A bell crank lever 238 in the right station is fulcrumed on an extension 240 of the right upright member 28. An arm 242 of the bell crank lever 238 is connected to the right slide rod 206 by a link 244. The other arm 246 of the bell crank lever 238 has connected thereto a rod 248 located at the rear of the machine and extending to the left from the bell crank lever and having its left end portion pivotally connected to an arm 250 of a bell crank lever 252 pivoted at its elbow on an extension 254 of the left upright member 28. The other arm 256 of the bell crank lever 252 is connected by a link 257 to the rear portion of the slide rod 212.

The construction and arrangement of the assembly above described are such that when the right outer mold carrier 98 advances inwardly causing the retainer block 196 at the right side of the machine to move forwardly, the bell crank lever 238 swings clockwise operating through the rod 248 to cause the arm 256 of the bell crank lever 252 to swing counterclockwise thus advancing the slide rod 212 and the retainer blocks 200 forwardly from their rest position on the upright member 26 into locking engagement with the base portions of the two front inner legs of the carriers 146 and 148. It will be understood that the locking movement of the retainer blocks 196, 200 and 202 is timed to take place after the outer mold carriages have been advanced inwardly and the advancement of the outer mold carriage is timed to take place after the carriers 146 and 148 have completed their downward movement. This chain of operations occurs before the sole molds move upwardly sufficiently to exert any appreciable upward pressure against the shoes and consequently the shoes are positively held by the retainer blocks against upward movement by the heavy upward pressure of the bottom mold members.

Referring now to the structure of the carriers 146 and 148 each carrier has a horizontal central portion 258 of inverted channel construction extending longitudinally over the molding station. Within the channels are mounted the members 154 (Fig. 2) which carry the shoe supporting forms 156 (Fig. 4). In the illustrated organization each of the members 154 is moved forwardly and then swung upwardly to present the completed shoe to the operator for removal from the shoe supporting form, such movements of the member 154 being effected automatically by hydraulic means to be described. The member 154 is generally rectangular as seen in side elevation in Fig. 2 and has formed therein a longitudinal slot 157. A cross pin 260 is mounted in trunnion blocks 262 located at opposite sides of the member 154, said cross pin being arranged to extend through the slot 157. The trunnion blocks are slidably mounted in horizontal channels or grooves (not shown) formed in the side walls of the horizontal portion of the carrier 146 and flanges formed in the trunnion blocks engage the inner surfaces of the side walls. The trunnion blocks support the member 154 for movement longitudinally relatively to the horizontal portion of the carrier 146. To the rear of the member 154 and mounted in the upper portion of the rear leg 152 of the carrier 146 is a horizontal double acting piston 266 having a rod 268 extending forwardly therefrom and pivotally connected to a link (not shown) which extends through the slot in the member 154 and has its forward end portion pivotally mounted on the pin 260. Forward movement of the piston 266 serves to move the member 154 forwardly through the channel in the carrier 146. Formed on the bottom of the member 154 and extending laterally in opposite directions therefrom is a plate 272 which rides on and is supported by rolls 274 mounted on the forward portions of levers 276 pivoted respectively on opposite end portions of a cross pin 278 journaled in the ribs 192 and 194 of the rear leg. The rear portions of the levers 276 overlie bosses 280 projecting from the ribs 192 and 194. For applying downward pressure to the rear end portions of the levers 276 compression springs 282 are contained between the levers and suitable bosses formed in the ribs 192 and 194. The rolls 274 carried by the levers are adjustable vertically by adjusting screws 284 threaded through the levers 276 forwardly of the springs 282 and arranged to engage the bosses 280. When the member 154 is at the limit of its rearward movement the rolls 274 are pressed upwardly by the action of the springs 282 with sufficient force to lock the member 154 against forward movement by clamping it against the bottom edge of a portion of the carrier 146. Formed in the member 154 are upstanding ears 286 (Fig. 1) which embrace the lower end of a link 288 pivotally mounted on a pin 290 (Fig. 2) fixed in the ears. On the outwardly extending end portions of the pin 290 are swiveled blocks 292 (Fig. 2) having curved upper surfaces 294 which engage complementally shaped surfaces formed in the carrier. The engagement of these surfaces positively holds the member 154 against upward movement relatively to the carrier 146. Mounted on the pin 290 with the link 288 is a bifurcated head 296 (Fig. 1) of a lever 298 fulcrumed in the carrier. The lever 298 extends longitudinally of the carrier and its rear end portion is pressed downwardly against a lug 300 (Fig. 2) by a spring pressed plunger 302. The arrangement of the assembly above described is such that when the member 154 is in its rearmost position in the carrier its forward portion is locked against the carrier by the action of the plunger 302 on the lever 298, the link 288 pressing upwardly on the member 154 and keeping the surfaces 294 in contiguous relation to the complementally shaped surfaces in the carrier.

In the operation of the illustrated organization the carriers 146 and 148 are elevated after the completion of the vulcanizing operation whereupon the piston 266 operating through the rod 268 causes the member 154 to be moved forwardly relatively to the carrier. When the trunnion blocks 262 advance through their ways the member 154, with the completed shoe thereon, rides off the rolls 274 thus freeing its rear end portion. Continued advancement of the piston 266 thereafter causes the link 288 to swing upwardly and forwardly about its connection with the lever 298 thus tilting the member 154 upwardly until the shoe form 156 is brought into its loading station ready for the removal of the completed shoe and the mounting thereon of another shoe to be operated upon. During the upward swinging movement of the member 154 it is guided by the upper surfaces 294 of the blocks 292 which at that time bear against complementally shaped surfaces formed in the carrier. If desired the shoe form may be caused to occupy a position above the level of the member 154 by causing the piston 266 to advance into a position in which its pivotal connection with the member 154 is forward of a vertical plane common to the pin 260.

After the removal of the completed shoe from the shoe form 156 and the mounting thereon of another shoe to be operated upon the power cycle of the machine is initiated to cause the piston 266 to move rearwardly thus causing the member 154 with the shoe form attached thereto to be swung about the pin 260, the plate 272 being returned by the spring 282 to its position above the rolls 274. The member 154 is then moved bodily rearwardly until it reaches the position in which it is automatically locked to the carrier by the operation of the levers 276 and 298. With the member 154 in its locked position the carrier may move downwardly to bring the shoe into the molding and vulcanizing station.

The hydraulically operated mechanisms are actuated by pressure fluid supplied from a reservoir 304 by means of a low pressure pumping unit 306 and a high pressure pumping unit 308 mounted on a table 310 positioned above the reservoir 304, the two pumping units being operated by a suitable electric motor 312. Mounted on a shelf 314 above the motor is a timing apparatus 316 hereinafter described which determines the sequence and relative timing of the operations of certain machine elements. Preferably the reservoir and the pumping unit are capable of operating a plurality of machines simultaneously and the timing apparatus comprises a battery of timing devices constructed and arranged to control the operations of a plurality of machines.

When a pair of shoes to have soles molded and vulcanized thereto have been placed on the shoe forms 156 and a suitable charge of vulcanizable material has been deposited on each of the bottom mold members, a starting handle 318 is depressed to cause a valve to admit fluid under relatively light pressure to the front surface of the pistons 266 thus causing each of the shoe forms to be swung downwardly from its loading position and moved rearwardly into vertically spaced relation to the bottom mold members. As each member 154 comes to its rearmost position it operates a valve which causes pressure beneath the various supporting pistons 124, 58 and 186 to be relaxed so that the carriers 146 and 148 move downwardly by gravity until their legs rest on the rollers 158, 164 and 174. As the carriers move downwardly their inner forward legs press downwardly on a rod 320 (Fig. 6) which operates through mechanism hereinafter described to cause a valve to be opened to admit fluid under light pressure beneath the pistons 126, 56, 60 and 36 which actuate the side mold members and the bottom mold member. The pressure initially applied to the piston 36 is less than that applied to the other three pistons. The outer side mold carriages 98 and 100 are moved inwardly by the operation of the pistons 126 and brought into engagement with the sides of the shoes to be operated upon. If the shoes are not in correct horizontal angular relation to the bottom mold members the engagement of the outer mold members with the sides of the shoes will swing the assemblies comprising the shoes, the shoe forms, and the carriers to cause the shoes to be oriented correctly. The mobile mounting of the carriers 146 and 148, heretofore described, facilitates such angular movement of the assemblies. Through the operation of the links 140 and 142 (Fig. 3) the inner mold carriages 94 and 96 are advanced outwardly into positions in which they are proximate to, but out of actual contact with, the outer mold carriages. Such movement of the inner mold carriages causes the retainer blocks 196, 200 and 202 to advance into position to lock the carriers 146 and 148 positively against upward movement. The application of low pressure beneath the pistons 36 causes the heads 44 to move upwardly thereby elevating the bottom mold members together with the heating elements. The upward movement of the pistons 36 also brings the wedges 116 into engagement with the extensions 120 of the outer mold carriages thereby to hold the outer mold members positively in their advanced positions. Before the bottom mold members begin to move upwardly under heavy pressure the pistons 56 and 60 operate to straighten the toggle links 90 and 92 thereby to bring the inner mold carriages 94 and 96 to the limit of their inward movement thus completing the closing of the side molds upon the shoes. The arrangement is such that the pistons 56 and 60 do not complete their operative movement until the pistons 126 (Fig. 5) have been fully actuated to advance the inner mold carriages. The charge in the mold which was previously placed on the upper surface of the bottom mold member now flows under the low pressure of the pistons 56 and 60 against the bottom mold member filling the voids in the mold cavity and engaging the entire surface of that portion of the shoe bottom exposed within the cavity. As the mold cavity nears the completion of the filling operation, fluid pressure beneath the piston 126 increases and when this pressure has reached a predetermined point it actuates a spring pressed valve in the timing apparatus 316 (Figs. 7 and 8) causing one of the three timing devices therein to commence its cycle. At a predetermined stage in the cycle of the timing device a cam member 322 mounted on a wheel 324 causes a microswitch 326 to close thus operating a solenoid 328 mounted at the left side of the frame 10. The solenoid operates mechanism hereinafter described to actuate a valve mounted on the frame 10 to cause a transfer from low pressure to high pressure beneath the piston 36. The transfer to high pressure causes the pistons 36 to apply heavy pressure to the charge in the mold in order to insure a strong and uniform bond of the vulcanized sole to the shoe bottom. At a later stage in the cycle of the timing device 316 a cam member 330 on the wheel 324 opens the microswitch 326 whereupon a spring associated with the solenoid 328 actuates mechanism whereby certain valves are operated to cause oil under high pressure to be brought to bear upon the upper surfaces of the pistons 36 moving them downwardly thereby retracting the bottom mold members and the wedges 116. The operation of the valves above referred to also causes the retraction of the pistons 126 whereby the outer mold carriages 98 and 100 are moved outwardly away from the molding station. The downward movement of the pistons 36 moves inner mold carriages 94 and 96 inwardly away from the molding station.

As the left outer mold carriage 100 is retracted a cam member 332 (Fig. 1) on the bottom of the carriage imparts downward movement to a rod 334 (Fig. 5) which operates through mechanism hereinafter described to cause pressure fluid to impart upward movement to the pistons 124, 158 and 186 thus elevating the carriers 146 and 148. When the carriers have reached the limit of their upward movement pressure increases below said pistons and when the pressure reaches a predetermined point a spring loaded valve is operated to cause the application of fluid pressure to the rear surfaces of the pistons 266 thereby moving the pistons forwardly to advance the members 154 in order to bring the shoe form 156 into its loading position.

It will be noted that the carriers 146 and 148 cannot be moved downwardly until the members 154 have been moved into their rearmost positions above the bottom mold members and it is impossible for the side mold members to advance into their closed position before the members 154 have brought the shoes carried thereby into the molding station. Furthermore, the carriers 146 and 148 cannot be moved upwardly to withdraw the shoes from the molding station until the molds have moved out of engagement with the shoes, and consequently there is no possibility of untimely upward movement of the carriers which would damage the shoes. It will also be noted that, in the illustrated organization the members 154 and the shoe forms 156 carrying the finished shoes cannot be moved forwardly into their loading stations until the carriers have moved upwardly into a position affording suitable clearance for such forward movement. It will be understood that these results are achieved by the operation of the actuating mechanism, including the hydraulic valves, in predetermined sequence. Referring to Figs. 1 and 5 these valves include a valve 336 which controls the vertical movement of the carriers 146 and 148. The downward movement of the carriers is further controlled by two valves 338 (Fig. 2) mounted in forwardly extending portions of the carriers respectively. The valves 338 are actuated by set screws 340 mounted at the forward extremities of the members 154. The straightening of the toggle links 90 and 92 to advance the side mold members is controlled by a valve 342 (Fig. 5) mounted in the frame 10. The vertical movements of the bottom mold members are controlled by a valve 420 mounted in the frame 10 behind and adjacent to the valve 342. For changing the pressure fluid system from low pressure to high pressure at the appropriate time a valve 344 (Fig. 6) is mounted in the frame 10 rearwardly of the two valves above mentioned. At the end of the cycle of operations the valve 344 transfers the system back to low pressure.

In the operation of the illustrated machine, when shoes to have soles molded thereon and vulcanized thereto have been placed upon the shoe forms 156 mounted upon the members 154 the operator moves the starting handle 318 (Fig. 5) to the left to operate a bell crank lever 346 on which the handle is mounted. The bell crank lever is fulcrumed upon a pin journaled in a forward portion of the forward standard 18. The horizontal arm of the bell crank lever is connected by a downwardly extending rod 348 to a lever 350 fulcrumed on a lug 352 which extends downwardly from the forward frame member 12. At its right end the lever 350 carries a pin 354 on which are fulcrumed three members 356, 358 and 360. The member 356 extends downwardly and has its lower end portion pivotally mounted in a fork 362 mounted on a stem 364 of the valve 336. When the starting handle 318 is moved to the left the rod 348 is moved upwardly thus imparting upward movement to the lever 350, the member 356, the stem 364 and the sliding element of the valve 336. This operation of the valve causes the piston 266 (Fig. 2) to move rearwardly in order to bring the member 154 into its rearmost position above the bottom mold member. Just before the member 154 comes to the limit of its rearward movement the set screw 340, at the forward extremity of the member, engages a push member 366 on the valve 338. Rearward movement of the push member opens the valve 338 to exhaust fluid from beneath the pistons which support the carrier thus permitting the carrier to move downwardly by its own weight. During the molding and vulcanizing operations the sliding element of the valve 336 is held against return movement after the release of the handle 318 by mechanism now to be described. A link 368 extends transversely rearwardly of the member 360 but forwardly of the member 358 and has its left end pivotally connected to a bell crank lever 370 fulcrumed at its elbow on a lug 372 extending downwardly from the frame member 12. The right end of the link 368 is pivotally connected to a similar bell crank lever 374 fulcrumed at its elbow on a lug 376 extending downwardly from the frame member 12. Mounted on the rear portion of the link 368 is a block 378. When the sliding element in the valve 336 is operated, as above described, the right end portion of the lever 350 is moved upwardly carrying with it the members 356, 358 and 360. When the starting handle 318 is released by the operator, after initiating the operation of the machine, the lever 350 is moved downwardly slightly by a spring 379 connected to the bell crank lever 346, further downward motion thereof being prevented by the block 378 which is engaged by the member 358. The block 378 is so arranged that when the link 368 is swung to the left by means hereinafter described the block 378 is moved out of alinement with the member 358 thus permitting the spring 379 to return the sliding element of the valve 336 to its normal position. To prevent the valve 336 from returning to its lower position when the link 368 is swung to the left a block 380 is secured to one arm of the fork 362. As soon as the link 368 together with the block 378 is disengaged from the member 358 and the sliding element of the valve 336 begins to move downwardly the block 380 drops onto the upper face of a pawl 382 thus preventing further downward movement of the valve member. The downward movement of the valve member is slight and does not affect the operation of the valve which, at this stage in the operation of the machine, is exhausting fluid from the cylinder under the pistons which operate the carriers 146 and 148 and causing the operation of fluid pressure rearwardly against the piston 266 (Fig. 2) in order to retain the members 154 in their positions of registration with the bottom mold members. The pawl 382 is mounted on a block on the upper surface of the casing of the valve 336. It will be recalled that upward movement of the valve 336 causes the members 154 to move rearwardly preparatory to the downward movement of the carriers. As the carriers move downwardly their inner foward legs engage a horizontal plate 384 (Fig. 3) which rests on a downwardly extending rod 320 (Fig. 6). The rod 320 extends downwardly through the upright members 26, the table 22 and between the forward standards 18, its lower end resting on the rod 388. The rod 388 (Fig. 6) extends downwardly through the frame member 12 and its lower portion bears against one arm of a bell crank lever 390 pivoted at its elbow on an arm 392 fixed to the frame member 12. The other arm of the bell crank lever 390 has pivoted thereto a rod 394 (Figs. 6 and 7). One arm 396 of a bell crank lever 398 which, as shown in Fig. 6, lies in a horizontal plane, is connected to the slotted end portion of the rod 394, the other arm 400 of the bell crank lever 398 having its hook shaped end portion arranged to engage a pawl 402 (Figs. 5 and 7). The pawl 402 is fulcrumed on a pin 404 (Fig. 5) mounted in a lug 406 extending downwardly from the frame member 12 and located to the right of the lug 376. Positioned rearwardly of the pawl 402 and mounted on the pin 404 is a pawl 408. The pawl 408 extends to the left and forwardly of the pawl 402. A bearing member 410 is pivoted to the upper portion of the pawl 402, the left end portion of the bearing member engaging an extension 409 of the pawl 408. When the carrier 146 is in its elevated position the pawl 408 engages the left end portion 412 of a lever 414 which is fulcrumed between its ends on a pin 520 mounted in a lug 416 extending downwardly from the frame member 12. Pivotally connected to the left end portion of the lever 414 is a downwardly extending form 418 which is pivotally connected to the stems of valves 342 and 420. During downward movement of the carriers into engagement with the horizontal plate 384 (Fig. 6) the lever 410 (Fig. 5) and the sliding members of the valves 342 and 420 are urged upwardly but are held against upward movement by the engagement of the pawl 408 with the left end portion 412 of the lever 414. When the inner forward legs of the carriers engage the plate 384 and depress the rods 320 and 388 the bell crank lever 390 is thereby swung in a counterclockwise direction, as seen in Fig. 6, thus causing the retraction of the rod 394. Such rearward movement of the rod causes the bell crank lever 398 to swing in a clockwise direction, as seen in Fig. 7, the arm 400 of the bell crank lever engaging the pawl 402 and moving it to the left. The pawl moves the bearing member 410 mounted therein to disengage the extension of the pawl 408 from the left end portion 412 of the lever 414 thus permitting the lever to move upwardly to operate the valves 342 and 420. The operation of the valve 342 causes fluid at high pressure to impart upward movement to the pistons 126 (Fig. 5) thus advancing the side mold members. Fluid under high pressure is also brought to bear against the pistons 56 and 60 (Fig. 2) to straighten the toggle links 90 and 92, it being understood that the toggle links cannot be straightened until after the inner mold members have been advanced by the operation of the piston 126. When the valve 420 is at the limit of its upward movement, fluid under low pressure elevates the pistons 36 (Fig. 1) to lift the bottom mold members and the wedges 116. At this stage in the operation of the machine the lever 414 to which the valves 342 and 420 are connected is urged upwardly. To provide for the operation of the lever its right end is pivotally connected to a link 422 which is connected to one arm of a bell crank lever 424 fulcrumed at its elbow on a lug 426 extending downwardly from the frame member 12. The other arm of the bell crank lever 424 has its bifurcated end portion pivotally connected to a sleeve 428 slidably mounted on a rod 430. The rod extends upwardly and to the right through apertures in the frame member 12 and the right forward standard 18 and into the recess 104. The upper end portion of the rod 430 is pivotally connected to a lever 432 fulcrumed on the rod 136. As hereinbefore described, the rod 136 is mounted in lugs on the forward standard 18 in the upper part of the recess 104, the right piston 126 being connected to the rod 136 by the rod 128 and the bell crank lever 132 fulcrumed on an intermediate portion of the rod 136. The upper arm of the bell crank lever 132 is so connected to the right outer mold carriage 98 that upward movement of the piston 126 causes inward movement of the mold carriage and, conversely, downward movement of the piston causes outward movement of the mold carriage. Concomitantly with the operation of the bell crank lever 132 the piston 126 operates the rod 136 in the performance of an operation hereinafter described. Threaded on the lower portion of the rod 430 is a nut 434 and threaded on the upper portion of the rod above the sleeve 428 is another nut 436. Between the sleeve 428 and the nut 436 is a collar 438 slidably mounted on the rod 430, and between the sleeve and the nut 434 is another collar 440. A compression spring 442 surrounding the rod 430 is confined between the nut 436 and the colar 438, and a compression spring 444 surrounding the rod 430 is confined between the nut 434 and the collar 440, the arrangement being such that in any setting of the assembly one of the two springs is compressed and the other is relaxed. Prior to the elevation of the right piston 126 the lever 432 and the rod 430 are at the limit of their downward movement and the nut 436 has compressed the spring 442 against the sleeve 428 which, at this time, is held against downward movement by the lever 414 which is retained by the pawl 408.

It has been seen that when the carriers 146 and 148 move downwardly into engagement with the horizontal plate 384 the pawl 408 is disengaged from the left end portion of the bearing member 410 thus permitting the lever 414 to be actuated by the spring 442 to operate the valves 342 and 420. As hereinbefore described, the operation of the valve 342 causes upward movement of the pistons 126, the right hand piston operating the bell crank lever 132 to advance the right outer mold carriage 98 inwardly. The operation of the bell crank lever 132 causes the rod 136 to rotate in a counterclockwise direction thus causing the lever 432 to lift the rod 430. The upward movement of the rod causes the spring 442 to be relaxed and the lower spring 444 to be compressed, this being effected by the action of the nut 434 which acts against the spring 444, the spring in turn bearing against the collar 440 which engages the sleeve 428.

Means now to be described operates at this stage in the machine cycle to hold the sleeve 428 against movement by the spring 444. Mounted on the casing of the valve 342 is a bracket 446 on which is pivoted a bell crank lever 448. The left arm 450 of the bell crank lever has formed thereon a boss 452, and secured between the boss and the extending portion 409 of the pawl 408 is a light tension spring 454. The other arm 456 of the bell crank lever 448 extends upwardly. Prior to the depression of the horizontal plate 384 by the downward movement of the carriers 146 and 148 the arm 456 is arranged just to the left of the lower portion of the left end portion 412 of the lever 414. When the legs of the carriers depress the horizontal plate 384 and thus operate the pawls 402 and 408 to release the lever 414 for upward movement, the extending portion of the pawl 408 is swung upwardly and this upward movement exerts sufficient tension on the spring 454 to cause the bell crank lever 448 to swing into a position in which its arm 456 is located beneath the lower portion of the left end portion 412 of the lever 414. As heretofore described, the upward movement of the right piston 126 elevates the rod 430 and energizes the spring 444 on the rod causing it to apply pressure to the sleeve 428, the lever 414, and the sliding members of the valves 342 and 420, the operation of the spring 444 at this time being prevented by the engagement of the lower portion of the left end portion 412 of the lever 414 with the upper arm 456 of the bell crank lever 448.

As hereinbefore described, the upward movement of the pistons 126, 56, 60 and 36 causes the inner mold members to be advanced into shoe engaging position and causes the bottom mold member to be elevated. When the pressure beneath the piston 126 has increased to a predetermined value, which does not take place until after the pistons 126, 56, 60 and 36 have reached their operating positions, the force of a spring in the timing apparatus 316 is overcome and one of the three timing assemblies in the timing apparatus is caused to start its operating cycle. At this stage in the operation of the machine the inner mold members are pressed firmly against the shoes and the bottom mold members are urged upwardly under low pressure causing the charge in the mold to fill the voids in the mold cavity and come into intimate contact with the sole portion of the shoe.

After a predetermined period of time, usually from two to three minutes, the timing device actuates the microswitch 326 which controls the operation of the solenoid 328 (Fig. 5). The solenoid is connected by a link 458 to the bell crank lever 370 which is connected to the link 368 and the bell crank lever 374. Pivotally mounted on the right end portion of the bell crank lever 374 is a depending striker 460. The lower portion of the striker is urged to the right by a spring 462 but movement of the striker in response to the spring is restrained by the engagement of the striker with an arm 464 of a bell crank lever 466 (Figs. 5 and 7), the striker 460 being immediately above an arm 468 (Fig. 6) of a bell crank lever 470. The bell crank lever 466 is fulcrumed on the lower portion of a pin 472 which has pivotally mounted on its upper portion the bell crank lever 398 which is operated by the downward movement of the carriers 146 and 148. The arm 468 extends forwardly and the bell crank lever 470 is fulcrumed at its elbow on a pin 471 mounted in an extension 474 of the frame 10. The arm 476 of the bell crank lever 470 extends upwardly and its rear surface is notched to receive a forward arm 478 of a three-armed lever fulcrumed on a pin 479 mounted in the rear upper portion of the extension 474. A lower arm 480 of the three-armed lever is connected by a link 482 to the plunger of the valve 344. At the time when the microswitch 326 (Fig. 9) is actuated the valve 344 is under fluid pressure but is held against forward movement in response to such fluid pressure by the engagement of the forward arm 478 of the three-armed lever in the notch formed in the rear surface of the arm 476 of the bell crank lever 470. In the operation of the illustrated machine when the microswitch 326 energizes the solenoid 328 (Fig. 5) the link 458 is moved downwardly by the solenoid actuating the bell crank lever 370, moving the link 368 to the left thus causing the bell crank lever 374 to move the striker downwardly against the arm 468 of the bell crank lever 470 moving it downwardly to disengage the arm 476 from the arm 478 thus permitting counterclockwise movement of the three-armed lever by the fluid pressure exerted on its arm 480 by the valve 344 operating against the link 482. The operation of the valve 344 causes a transfer from low pressure to high pressure beneath the pistons 36, thus increasing the pressure applied by the bottom mold member to the charge in the mold cavity. The third arm 484 of the three-armed lever extends upwardly and is arranged to engage a rod 486 (Fig. 6) which engages the arm 488 of the bell crank lever 466 (Fig. 7). When the microswitch 326 is actuated and the arm 478 of the three-armed lever moves upwardly the arm 484 swings rearwardly, permitting the spring 462 (Fig. 5) to cause the lower portion of the striker 460 to move to the right engaging the arm 464 of the bell crank lever 466 and actuating it to cause the arm 488 (Fig. 7) to move the rod 486 rearwardly into engagement with the arm 484 of the three-armed lever which, at this stage, is in its rearmost position. Such movement of the striker 460 brings its lower end portion into a position above the bell crank lever 448 and to the left of the boss 452. After a predetermined period of time, usually about eight minutes, the microswitch 326 again energizes the solenoid 328 causing the striker 460 to move downwardly again actuating the bell crank lever 448 to disengage its arm 456 from the left end portion 412 of the lever 414. Thereupon the left end portion of the lever is moved downwardly by the spring 444 returning the plunger of the valves 342 and 420 to their lower positions. In this position of the valve 342 fluid beneath the pistons 56 and 60 is exhausted as is also the fluid beneath the piston 126 but fluid at high pressure is brought to bear upon the upper portions of the double acting pistons 126 which actuate the side mold members. When the valve 420 is in its lowermost position fluid beneath the double acting piston 36 (Fig. 1) is exhausted and fluid at high pressure is brought to bear upon the upper portion of the piston. The pistons 36 and the bottom mold members are moved downwardly breaking the toggles 90, 92 and lowering the wedges 116. At the same time the pistons 126 move downwardly causing the side mold members to move out of their shoe engaging positions. The downward movement of the valve 420 also causes the plunger of the valve 344 (Fig. 6) to be moved rearwardly causing the three-armed lever to resume its original position, so that the arm 478 engages the notch in the arm 476 of the bell crank lever 470. The arm 484 also advances the rod 486 to actuate the bell crank lever 466 (Fig. 7) causing its arm 464 to move the striker into its position over the bell crank lever arm 468 in preparation for the next cycle of the machine. The pressure below the piston 126 being relaxed, the timing device terminates its cycle and returns to its starting position ready for the next cycle of the machine. When the left end portion of the lever 414 (Fig. 5) has moved downwardly, the pawl 408 is moved to the right by the spring 454 bringing its right end portion into a position immediately above the left end portion 412 of the lever 414. Thus it will be seen that when the outer right mold carriage 98 moves outwardly the upper spring 442 on the rod 430 is compressed urging the left portion of the lever 414 to lift the plunger of the valves 342 and 420, such upward movement at this time being prevented by the pawl 408. All of the mold members are now retracted and all that remains to complete the cycle of the machine is to elevate the carriers 146 and 148 and advance the members 154 to bring the shoe forms 156 into their loading stations. Preparatory to these movements of the carriers and the members 154 the valve 336 is caused to move downwardly by the operation of mechanism now to be described. Extending upwardly from a recess in the pawl 382 is the rod 334 the upper end portion of which is located in a recess in the lower portion of the left inner mold carriage 94. Located in the recess is the cam member 332. When the mold carriage 94 is moved inwardly to its inoperative position the cam member 332 bears on the upper portion of the rod 334 moving the left portion of the pawl 382 (Fig. 5) downwardly thus disengaging the pawl from the block 380 so that a spring incorporated in the valve 336 moves the valve plunger downwardly, causing fluid pressure to elevate the pistons which lift the carriers 146 and 148 into their rest positions. As the carriers move upwardly the horizontal plate 384 (Fig. 6) is returned to its uppermost position by the operation of the bell crank lever 390 by a spring 498. Upon the completion of the upward movement of the plate 384 pressure increases beneath the pistons which elevate the carriers and when a predetermined pressure has been reached, pressure fluid acts on the pistons 266 (Fig. 2) to advance the members 154 into their loading stations. The completed shoes may now be removed from the shoe forms 156 and another pair of shoes to be operated upon may be mounted thereon.

In the event that a shoe becomes misplaced relatively to the mold members it may be necessary for the operator to arrest the operation of the machine in order to correct the condition. Accordingly, the machine is provided with an emergency stop mechanism now to be described. A bell crank lever 500 (Figs. 1 and 5) is pivoted at its elbow on a pin mounted in the lower right-hand portion of the left forward standard 18. An arm 502 of the bell crank lever extends upwardly and has pivotally connected thereto a link 504 the right end of which is connected to an arm 506 of a bell crank lever 508 pivoted at its elbow to the lower left portion of the right forward standard 18. Pivotally connected to the other arm 510 of the bell crank lever 508 is a sliding bar 512 which extends downwardly through an aperture in the frame member 12 and has its lower end portion connected to a lever 514 by a pin 516 which travels in a slot 518 formed in the link 512. The lever 514 carries at its right end a pin 520 which is journaled in the frame member 12 and on which the lever 414 is pivotally mounted. Pivotally mounted on an arm 522 of the bell crank lever 500 is a downwardly extending bar 524 the lower end portion of which is pivotally connected to a lever 526 fulcrumed between its ends on a pin 528 mounted in the frame 10. Mounted to swing with the lever 526 is an arm 530 which carries a stud 532 which engages an overhanging right end portion 533 of the pawl 382. The lever 526 also carries a stud 534 which engages an arcuate left end portion of the member 360. The lever 526 carries at its right end a third stud 536 which engages the right end portion of the boss 452 on the bell crank lever 448. The arm 522 of the bell crank lever 500 carries a knob 538. In its inoperative position the arm 522 engages the lower right portion of an arm 540 of a bell crank lever 542, said arm having in its upper portion a notch 544. The bell crank lever 542 is fulcrumed at its elbow on a pin 543 mounted in the left forward standard 18. Mounted on the arm 546 of the bell crank lever is a knob 548. The arm 540 of the bell crank lever is normally held against the arm 522 of the bell crank lever 500 by a spring 550 one end of which is anchored to the arm 546 and the opposite end to the frame member 12. When the plungers of the valves 336, 342 and 420 are in their lowermost positions the carriers 146 and 148 are elevated and the members 154 are advanced to bring the shoe forms 156 into their loading stations and the mold carriages are retracted into their inoperative positions. Thus, it will be seen that the operation of the machine may be terminated at any time by the downward movement of the plungers in said valves. Accordingly, if the plunger of the valve 336 is held in its upward position by engagement of the member 358 on the member 330 carried by the link 368 the operator may terminate the machine cycle by an upward movement of the arm 522 of the bell crank lever 500, the knob 538 having been provided to facilitate this manual operation. The upward movement of the arm 522 lifts the bar 524 causing the stud 534 to bear against the arcuate portion of the member 356, moving said member to the right and with it the member 358, disengaging the member 358 from the block 378 to permit the valve plunger to be moved downwardly. Such movement of the bar 524 causes the arm 530 to swing clockwise bringing the stud 532 into engagement with the overhanging portion of the pawl 382, disengaging the pawl from the block 380 and permitting the valve plunger to move downwardly as soon as the arm 522 of the bell crank lever 500 has completed its upward movement. The arm 522 is retained in its uppermost position by its engagement in the notch 544 in the bell crank lever 542.

As previously stated, the downward movement of the plungers of the valves 336, 342 and 420 causes the machine to return to its rest position and upward movement of the bell crank lever arm 522 will cause the plungers of the valves 342 and 420 to return to their lower positions even though they have reached their upper positions when the operator wishes to stop the machine. It will be remembered that when the plungers of the valves 342 and 420 are in their uppermost positions the carriages 98 and 100 of the outer mold members are moved inwardly. Such inward movement of the carriages acting on the rod 430 and the spring 444 tends to move the lever 414 downwardly but such downward movement is prevented by the engagement of the arm 456 of the bell crank lever 448 with the left end portion 412 of the lever 414 (Fig. 5). Accordingly, when the lever 526 is rocked to elevate its left end portion, the consequent downward movement of the right end portion will bring the stud 536 to bear against the boss 452 causing the arm 456 of the bell crank lever 448 to be disengaged from the lever 414, thus permitting the plungers of the valves 342 and 420 to be moved downwardly and by the spring 444. There is, however, a stage in the machine cycle when, although the plungers of the valves 342 and 420 are elevated, the right mold carriage 98 has failed to move inwardly because of insufficient pressure against the piston 126. Under these circumstances the spring 444 is not acting on the lever 414 and when the emergency stop mechanism is actuated and the arm 522 of the bell crank lever 500 is moved upwardly, the other arm 502 of the bell crank lever is swung to the right causing the sliding bar 512 to move downwardly, thus imparting downward movement to the pin 516 and causing the arm 514 to move downwardly and with it the lever 414 and the plungers of the valves 342 and 420.

The emergency stop mechanism is returned to its inoperative position by upward movement of the arm 546 of the bell crank lever 542, the arm 522 of the bell crank lever 500 being moved downwardly after it is clear of the notch 544.

Referring now to Figs. 8 and 9, illustrating the timing apparatus 316, it will be remembered that this apparatus is mounted on the shelf 314 above the pumping units and the electric motor as shown in Fig. 1. It will also be remembered that the timing apparatus is actuated by an increase in fluid pressure beneath the pistons 126 which actuate the inner mold members. When the fluid pressure reaches a predetermined point, one of the timing devices in the apparatus 316 commences its cycle of operation. Three such timing devices are provided in the illustrated apparatus one for each of the three machines controlled thereby. The illustrated timing apparatus comprises a frame 552 having mounted thereon a synchronous motor 554 which operates through a reduction gearing and coupling to impart continuous rotation to a shaft 556 at the rate of approximately six rotations per minute. The shaft extends lengthwise of the apparatus and is journaled in bearings in its front and rear walls. Mounted eccentrically on the shaft 556 are three pawls 558 which act on three ratchet wheels 560. The ratchet wheels 560 are mounted on a shaft 562 journaled in bearings in the front and rear walls of the frame 552 below the shaft 556 and to the right thereof. A pawl 558 and a ratchet wheel 560 is provided for each of the three timing units of the illustrated apparatus. Inasmuch as the timing units are of identical construction the following description of the construction of one of the units will be understood to apply equally well to the other two. The ratchet wheel 560 is mounted on a sleeve 564 rotatably mounted on a collar 566 fixed to the shaft 562 by a tapered pin 568. To the right of the sleeve 566, as seen in Fig. 8, and surrounding the shaft 562 is a torsion spring 570 the left end portion of which is anchored to the collar 566 and the right end portion of which is anchored to a sleeve 572 rotatably mounted on the shaft 562. The sleeve 572 is secured in the right end portion of a composite drum 574, the left portion of which is secured to the ratchet wheel 560. The drum 574 comprises two sections of different diameters, the left section 575 adjacent to the ratchet wheel being the larger. Mounted on the larger section of the drum is the wheel 324. When the pawl 558 engages the ratchet wheel, as hereinafter described, the ratchet wheel is rotated in a clockwise direction, as seen in Fig. 9, against the force of the torsion spring 570. The pawl 558 is normally in ratchet engaging position but when the timing unit is at rest the pawl is held disengaged from the ratchet wheel by a lever 578 (Fig. 9). When the timing unit is in operation the lever 578 is disengaged from the pawl 558 and consequently each rotation of the shaft 556 causes the pawl to advance the ratchet wheel to the extent of the space between any two adjacent teeth. Inasmuch as the ratchet wheel moves against the force of the torsion spring 570 the ratchet wheel would normally be returned to its starting position by the torsion spring after the pawl has advanced the ratchet and then moved out of engagement therewith. In the illustrated organization such return movement of the ratchet wheel is prevented by the engagement of a pawl 580 (Fig. 9) with the lower portion of the ratchet wheel so that the ratchet wheel may be revolved step by step in a clockwise direction by the operation of the pawl 558. The lever 578 is pivotally mounted on a shaft 582 journaled in the frame 552, said shaft being common to the three timing units. The tail 584 of the lever 578 engages a plunger 586 mounted in the right portion of the frame 552, the plunger being normally urged downwardly by means hereinafter described. Mounted on a sleeve 588 on the shaft 582 is an arm 590 which is positioned rearwardly of the lever 578 and is movable therewith. The arm 590 extends downwardly and its lower end portion is arranged to engage an arm 592 of a bell crank lever 594 fulcrumed at its elbow on a sleeve mounted on a shaft 596 journaled in the frame 552 and common to the three timing units. The other arm 598 of the bell crank lever 594 extends to the left and has pivotally mounted at its end portion the pawl 580 which is urged upwardly by a spring plunger 600. When the bell crank lever 594 is in its rest position, the pawl 580 is held out of engagement from the ratchet wheel 560 by the engagement of a stud 602 on the arm 598 with a tail portion of the pawl. Below the plunger 586, a chamber 604 is formed in the frame 552 and receives pressure fluid from the same line which supplies pressure fluid to elevate the pistons 126 which advance the outer mold members. When the fluid in the chamber 604 reaches a predetermined pressure, the plunger 586 is elevated thus lifting the tail portion 584 of the lever 578 and disengaging the lever from the pawl 558 thus permitting the pawl to engage the ratchet wheel 560 and move the wheel in a counterclockwise direction at the rate of one tooth for each rotation of the shaft 566. The operation of the plunger 586 also causes the arm 590 to be swung to the right against the arm 592 of the bell crank lever 594, swinging the bell crank lever clockwise. The other arm 598 of the bell crank lever 594 is moved upwardly permitting the pawl 580 to engage the ratchet wheel 560 and hold it against return movement. It will be remembered that the transfer from low fluid pressure to high fluid pressure against the pistons 36 which elevate the sole mold is effected by the operation of the microswitch 326 which also causes the operation of the valves 336, 342 and 420 (Fig. 5). The means whereby the microswitch is operated will now be described. Referring to Fig. 9 the microswitch 326 is positioned below the chamber 604 and extending downwardly therefrom is a leaf spring 606 which bears against the right end portion of a plunger 608. Arranged to engage the left end portion of the plunger is a downwardly extending arm 610 of a bell crank lever 612 fulcrumed at its elbow on the upper left end portion of the arm 598 of the bell crank lever 594 forwardly of the pawl 580. The other arm 614 of the bell crank lever 612 extends to the left and carries at its end portion a cam roll 616 which moves upwardly into a position to be engaged by the cam pieces 322 and 330 when the bell crank lever 594 is swung to the right. The cam pieces are placed at selected intervals on the wheel 324 which revolves in a counterclockwise direction with the ratchet wheel 560. Thus it will be seen that the position of the cam pieces on the wheel 324 determines the time when the microswitch will be operated as will now be described. From the foregoing description it will be understood that when the pressure in the chamber 604 increases sufficiently to cause the bell crank lever 594 to be actuated, the bell crank lever 612 is swung upwardly to bring the cam roll 616 into position to be engaged by the cam pieces 322 and 330. After the bell crank lever 594 is swung to the right, the ratchet wheel 560 begins to rotate thus effecting the rotation of the wheel 324. The cam piece 322 is so located on the wheel 324 that when the bottom mold members have been pressed upwardly under low pressure for a predetermined time, usually two minutes, in order to permit the charge in the mold to fill the voids in the mold cavity and to come into intimate contact with the bottom of the shoe before the application of high pressure takes place, the wheel 324 will have reached a position in which the cam member 322 engages the cam roll 616 and swings the arm 614 downwardly. The downward movement of the arm 614 causes the arm 610 of the bell crank lever 612 to move to the right actuating the plunger 608 which in turn actuates the leaf spring 606 to close the microswitch 326 thus energizing the solenoid 328 (Fig. 5) which effects the transfer from low fluid pressure to high fluid pressure beneath the pistons 36 (Fig. 1). During the application of high pressure to the bottom mold members the ratchet wheel 560 and the wheel 324 continues to rotate under the operation of the pawl 558. The cam member 330 is so located on the wheel 324 that after a predetermined period of time, usually eight minutes, the cam member 330 engages the cam roll 616 operating the microswitch again and thus causing the valves 336, 342 and 420 to move downwardly thus returning the operating instrumentalities of the machine to their respective inoperative positions. The downward movement of the valve 342 causes the fluid beneath the pistons 126 (Fig. 5) and in the chamber 604 to be exhausted. The release of the pressure in the chamber 604 causes a spring (not shown) to move the plunger 586 downwardly out of engagement with the tail portion 584 of the lever 578. A spring plunger 618 positioned rearwardly of the arm 592 moves the arm 592 to the left disengaging the pawl 580 and the cam roll 616 from the ratchet wheel 560 and the wheel 324 respectively. The operation of the spring plunger 618 also moves the arm 590 to the left causing the lever 578 to retract the pawl 558 into a position in which it is clear of the ratchet wheel 560 so that the ratchet wheel and the wheel 324 may return to their respective starting positions under the action of the torsion spring 570. To prevent the ratchet wheel 560 and the wheel 324 from moving past their starting positions under the action of the spring 570, an extension 620 is formed in the drum 574 and arranged to engage a shock absorber 622 fixed to the left side portion of the frame 552.

In the foregoing description the cam members 322 and 330 have been described as operating first after a two minute interval and finally after an eight minute interval. It will be understood, however, that the cam members are adjustable to permit variations in the time intervals by merely moving them circumferentially upon the wheel 324. A suitable scale is inscribed on the wheel to assist the operator in the adjustment of the cam members.

The timing apparatus 316, as above described, comprises three timing units each of which may control the operation of one machine. These units, though having several parts in common, may be operated independently of each other.

It will be understood that the construction and operation of the timing apparatus are such that three vulcanizing machines constructed as hereinbefore described and connected respectively to the timing apparatus may be operated in series by a single operator or, if desired, they may be operated in unison by three operators. It is also practicable to operate only one machine while the other two remain idle.

Briefly reviewed, the operation of the illustrated machine is as follows: Referring to Fig. 5, the operator swings the bell crank lever 346 in a clockwise direction by means of the handle 318, thereby causing the valve 336 to open a pressure line to the front of the piston 266 (Fig. 2), the member 154 at this time being at the limit of its forward movement, with the shoe form 156 (Fig. 4) in its loading station. The operation of the piston 266 swings the shoe form downwardly to bring the shoe bottom into a generally horizontal position and moves the member 154 rearwardly relatively to the carrier 146 to bring the shoe into vertically spaced relation to the bottom mold member 48. As the member 154 approaches the limit of its rearward movement, the pin 340 (Fig. 2) at the forward end of the member 154 operates a valve 338 to open an exhaust line communicating with the pistons 58, 124 and 186, thus permitting downward movement of the carrier 146 by gravity to bring the shoe into the molding station. The downward movement of the carrier opens the valves 342 and 420 (Fig. 5). The operation of the valve 420 opens a low pressure line to the piston 36 (Fig. 1) which elevates the bottom mold member 48 and opens a pressure line to the piston 126 which advances the outer mold member 51 and partially advances the inner mold member 49 in the opposite station. Upon the completion of the initial advancement of the inner mold member, fluid under high pressure flows through the valve 342 (Fig. 5) and to the piston 126 which advances the outer mold member and the retainer blocks which positively hold the carrier against upward movement. Fluid under high pressure flowing through valve 342 also actuates the pistons 56 and 60 (Fig. 2) which straighten the toggle links to advance the inner mold members. Pressure fluid flowing through the valve 342 also operates the plunger 586 (Fig. 9) to initiate the operation of the timing mechanism. After a predetermined period of operation during which low pressure is applied to the piston 36 to elevate the bottom mold member, the cam 322 on the wheel 324 engages the cam roll 616 to actuate the bell crank lever 594 which operates through mechanism hereinbefore described to close the microswitch 326 thereby operating the solenoid 328 (Fig. 5) which releases a latch mechanism to permit the operation of the valve 344 (Fig. 6) which opens a high pressure line to the bottom of the piston 36. After a predetermined period during which high pressure is maintained on the piston 36, and through the piston and its associated mechanism against the bottom mold member 48, a cam member 330 (Fig. 9) on the wheel 324 engages the cam roll 616 again operating the microswitch 326 to energize the solenoid 328 (Fig. 5) which at this time actuates the striker 460 through mechanism hereinbefore described to cause the return of the plungers of the valves 342 and 420 to their lower or rest positions. The operation of the valve 420 causes fluid beneath the piston 36 (Fig. 1) to be exhausted and fluid at high pressure to act on the upper portion of the piston, thereby to move the bottom mold member downwardly. The downward movement of the piston 36 also breaks the toggle 90, 92 and the companion toggle at the rear of the machine, thereby to move the inner mold members toward each other into their respective rest positions. The downward movement of the piston 36 also lowers the wedge 116 (Fig. 1) to permit the retraction of the outer mold member. The operation of valve 342 causes fluid beneath the piston 126 to be exhausted and fluid at high pressure to act upon its upper portion. The downward movement of the piston 126 causes the outer mold member to be retracted and also retracts the retainer blocks out of engagement with the legs of the carrier in order to permit upward movement of the carrier. The retraction of the inner mold carriage 94 operates the valve 336, through mechanism hereinbefore described, to bring fluid pressure to bear against the pistons which lift the carrier into its elevated or rest position. After the carrier moves upwardly pressure on the rear portion of the piston 266 (Fig. 2) increases sufficiently to advance into its loading station the member 154 which carries the shoe form 156.

It will be remembered that when the pressure below the piston 126 is exhausted the pressure in the chamber 604 (Fig. 9) in the timing apparatus is likewise exhausted thus permitting the plunger 618 to disengage the pawls 558 and 580 from the ratchet wheel 560, terminating the timing cycle and permitting the return of the timing instrumentalities to their starting positions by the operation of the torsion spring 570 (Fig. 8).

Having thus described my invention what I claim as new and desire to secure by Letters Patent of the United States is:

1. In a machine for molding outsoles on shoe bottoms, a sole shaped bottom mold member, side mold members constructed and arranged to cooperate with the bottom mold member to provide a mold cavity, a carrier for supporting a shoe in the machine, said carrier being mounted for movement toward and from the mold cavity, retainers for holding the carrier against movement from the mold cavity, means operated by movement of the carrier toward the mold cavity for causing the advancement of the side mold members, and means operated by the advancement of the side mold members for causing the advancement of the retainers into operating position.

2. In a molding machine, a frame structure, a bottom mold member, side mold members constructed and arranged to cooperate with the bottom mold member to provide a mold cavity, a work carrier movable toward and from the mold cavity, means for positively locking the carrier to the frame structure thereby to secure the carrier against movement from the mold cavity, and means operated by movement of the carrier toward the mold cavity for causing the operation of the locking means.

3. In a two-station molding machine, bottom mold members, outer side mold members, inner side mold members, said mold members being formed to provide between them a mold cavity, a carrier movable toward and from the mold cavity, means rendered operative by movement of the carrier toward the mold cavity for fully advancing the outer side mold members and partially advancing the inner side mold members, and means operated by the advancement of the outer side mold members for causing the application of heavy pressure to complete the advancement of the inner side mold members.

4. In a two-station molding machine, bottom mold members, outer side mold members, inner side mold members, said mold members being formed to provide between them a mold cavity, a carrier movable toward and from the mold cavity, means rendered operative by movement of the carrier toward the mold cavity for fully advancing the outer side mold members and partially advancing the inner side mold members, means for positively holding the outer side mold members against retraction from their fully advanced positions, and means for completing the advancement of the inner side mold members.

5. In a molding machine, a bottom mold member, side mold members constructed and arranged to cooperate with the bottom mold member to provide a mold cavity, a work carrier movable toward and from the mold cavity and movable by the engagement of the side mold members with the work on the carrier to bring the work into registration with the bottom mold member, means for advancing the bottom mold member thereby to apply pressure to a charge in the mold cavity, and retainer members constructed and arranged to be advanced into retaining position by the advancement of side mold members thereby positively to hold the carrier against movement away from the mold cavity in response to the operation of the bottom mold member.

6. In a molding machine, a bottom mold member, side mold members constructed and arranged to cooperate with the bottom mold member to provide a mold cavity, pressure fluid operated means for advancing the bottom mold member under light pressure, a first valve, a first cam for causing the operation of the valve to effect the application of heavy pressure to the bottom mold member, a second cam arranged to operate a predetermined time after the operation of the first cam to effect the retraction of the mold members, and a second valve for causing the operation of the side mold members and for thereafter causing the operation of the first cam and the second cam.

7. In a molding machine, a bottom mold member, side mold members constructed and arranged to cooperate with the bottom mold member to provide a mold cavity, a work carrier movable to position a work piece relatively to the mold members, means for advancing the bottom mold member, a cam, means operated by the cam for actuating mechanism for effecting the retraction of the mold members and the carrier, a synchronous motor, a member operable to make and break operating connections between the motor and the cam, and a valve operated by the movement of the carrier for first causing advancement of the side mold members and for thereafter causing the operation of said make and break member to connect the motor to the cam.

8. In a molding machine, a pair of side mold members constructed and arranged to close against a work piece supported in an operating station of the machine, a bottom mold member movable toward and from the work piece between the side mold members, a work carrier, means operable to cause the carrier to advance the work into the operating station, a first pressure fluid operated piston, means whereby the piston advances the side mold members into their closed position, a second pressure fluid operated piston for actuating the bottom mold member, a first valve for controlling the flow of pressure fluid to the first piston, a second valve for controlling the flow of pressure fluid to the second piston, a member operated by the advancement of the work carrier, and means whereby said member operates both the first valve and the second valve to cause the flow of pressure fluid to the first piston and the second piston, respectively, thereby to cause the advancement of the side mold members and the bottom mold member.

9. A two station molding machine having in each station a pair of side mold members constructed and arranged to close against a work piece supported in an operating station of the machine, a bottom mold member movable toward and from the work piece between the side mold members, a work carrier, and means operable to cause the carrier to advance the work into the operating station, said machine being characterized by a first pressure fluid operated piston common to the two stations of the machine, means whereby the piston advances the side mold members in both stations of the machine, a second pressure fluid operated piston for actuating the bottom mold member in one station, a third pressure fluid operated piston for actuating the bottom mold member in the other station, a first valve for controlling the flow of pressure fluid to the first piston, a second valve for controlling the flow of pressure fluid to the second piston and the third piston, an element operated by the advancement of one of the work carriers, means whereby said element operates the first valve to cause the flow of pressure fluid to the first piston thereby to cause the advancement of the side mold members, and means whereby said element operates the second valve to cause the flow of pressure fluid to the second piston and the third piston, respectively, thereby to cause the advancement of the bottom mold members.

10. In a molding machine, a plurality of mold members providing a mold cavity, said mold members comprising a bottom mold member, an inner side mold member, and an outer side mold member, a work carrier movable to and from an operating station in which the work covers the mold cavity, retainers for holding the carrier against movement away from the operating station, a first piston for advancing the outer side mold member and for concomitantly advancing the retainers into retaining position, a valve operated by the movement of the carrier into the operating station for causing the operation of the first piston, a second piston for applying pressure to the bottom mold member, the operation of the second piston being controlled by the operation of the valve.

11. In a molding machine, a bottom mold member, side mold members constructed and arranged to cooperate with the bottom mold member to provide a molding station, a work carrier constructed and arranged for downward movement into the molding station, a plurality of retainers for holding the carrier against upward movement from the molding station, means for biasing the retainers respectively to retracted positions, and means for closing the side mold members to provide a mold cavity and for concomitantly advancing the retainers into their respective operating positions.

12. In a molding machine, mold elements providing an open mold cavity, and means for moving a work piece to and from a position in which it provides a closure for the mold cavity comprising a tripodal carrier, a fulcrum element mounting a first leg of the carrier for angular movement, a rail mounting the fulcrum element for translatory movement, a first elevator for imparting upward movement to the rail, a second elevator for imparting upward movement to a second leg of the carrier, and a third elevator for imparting upward movement to a third leg of the carrier.

References Cited in the file of this patent

UNITED STATES PATENTS

| | | |
|---|---|---|
| 2,701,389 | Capdevila | Feb. 8, 1955 |
| 2,780,836 | Morin | Feb. 12, 1957 |
| 2,820,250 | Stratton | Jan. 21, 1958 |

FOREIGN PATENTS

| | | |
|---|---|---|
| 1,022,992 | France | Dec. 24, 1952 |
| 153,351 | Australia | Sept. 23, 1953 |
| 1,091,154 | France | Oct. 27, 1954 |
| 1,113,193 | France | Nov. 28, 1955 |